United States Patent
Apte et al.

(10) Patent No.: US 10,162,610 B2
(45) Date of Patent: *Dec. 25, 2018

(54) METHOD AND APPARATUS FOR MIGRATION OF APPLICATION SOURCE CODE

(71) Applicant: SYNTEL, INC., Troy, MI (US)

(72) Inventors: Abhijit Apte, Maharashtra (IN); Abhishek Negi, Maharashtra (IN); Vivek Rao, Maharashtra (IN); Amit Pundeer, Maharashtra (IN); Sagar Kulkarni, Maharashtra (IN); Prashant Ladha, Maharashtra (IN); Shashank Moghe, Maharashtra (IN); Vedavyas Rallabandi, Chennai (IN); Ravi Shankar, Maharashtra (IN); Lopamudra Dhal, Maharashtra (IN); Prabhat Parey, Maharashtra (IN); Abhishek Agarwal, Maharashtra (IN); Rahul Mehra, Maharashtra (IN)

(73) Assignee: Syntel, Inc., Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/397,473

(22) Filed: Jan. 3, 2017

(65) Prior Publication Data
US 2017/0192758 A1    Jul. 6, 2017

Related U.S. Application Data

(60) Provisional application No. 62/441,785, filed on Jan. 3, 2017, provisional application No. 62/274,488, filed on Jan. 4, 2016.

(51) Int. Cl.
*G06F 9/45* (2006.01)
*G06F 8/41* (2018.01)
(Continued)

(52) U.S. Cl.
CPC .............. *G06F 8/427* (2013.01); *G06F 8/51* (2013.01); *G06F 8/76* (2013.01); *G06F 17/303* (2013.01);
(Continued)

(58) Field of Classification Search
CPC ....................................................... G06F 8/427
(Continued)

(56) References Cited

U.S. PATENT DOCUMENTS 6,170,078 B1   1/2001   Erle et al.
6,247,172 B1   6/2001   Dunn et al.
(Continued)

FOREIGN PATENT DOCUMENTS

WO    2004077215 A2    9/2004

OTHER PUBLICATIONS

RES—A Pure Java Open Source COBOL to Java Translator (Aug. 1, 2010, 9 pgs.).
(Continued)

*Primary Examiner* — Chameli Das
(74) *Attorney, Agent, or Firm* — Dykema Gossett PLLC

(57) ABSTRACT

A method and apparatus for migration of application source code may include parsing the source code and generating a first output, dynamically analyzing the source code to produce a second output wherein the second output comprises runtime metadata associated with the application, converting, using the metadata, the source code of the application in an original language to a destination language on the second platform and a data source in an assigned format to a destination format. The method may include simulating memory to execute the source code by creating a dynamic memory array, executing the source code within the dynamic memory array, detecting and resolving parameters of the source code by monitoring execution of the source code, and
(Continued)

storing the detected and resolved parameters of the source code in a metadata register.

17 Claims, 11 Drawing Sheets

(51) Int. Cl.
| | |
|---|---|
| *G06F 17/30* | (2006.01) |
| *G06F 8/76* | (2018.01) |
| *G06F 8/51* | (2018.01) |
| *G06Q 10/10* | (2012.01) |
| *G06Q 10/08* | (2012.01) |

(52) U.S. Cl.
CPC .. *G06F 17/30684* (2013.01); *G06F 17/30705* (2013.01); *G06Q 10/087* (2013.01); *G06Q 10/10* (2013.01)

(58) Field of Classification Search
USPC .......................................................... 717/143
See application file for complete search history.

(56) References Cited

U.S. PATENT DOCUMENTS

| | | | |
|---|---|---|---|
| 6,334,215 B1 | 12/2001 | Barker et al. | |
| 7,559,050 B2 | 7/2009 | Burger | |
| 7,707,007 B2 | 4/2010 | Campbell | |
| 7,809,547 B2 | 10/2010 | Guenthner et al. | |
| 7,996,413 B2 | 8/2011 | Cotichini et al. | |
| 8,819,621 B2 | 8/2014 | Naik et al. | |
| 8,881,100 B2 | 11/2014 | Bohm et al. | |
| 9,389,890 B2 | 7/2016 | Hamby et al. | |
| 9,390,260 B2 | 7/2016 | Tan et al. | |
| 2002/0178233 A1* | 11/2002 | Mastrianni | G06F 8/60 709/217 |
| 2003/0188299 A1* | 10/2003 | Broughton | G06F 8/427 717/141 |
| 2005/0097521 A1 | 5/2005 | Liu | |
| 2005/0102572 A1 | 5/2005 | Oberlaender | |
| 2005/0262191 A1* | 11/2005 | Mamou | G06F 17/30563 709/203 |
| 2006/0067436 A1* | 3/2006 | Potkonjak | H03M 13/395 375/341 |
| 2006/0277531 A1 | 12/2006 | Horwitz et al. | |
| 2007/0050343 A1* | 3/2007 | Siddaramappa | G06F 17/30908 |
| 2007/0067756 A1 | 3/2007 | Garza | |
| 2008/0005619 A1* | 1/2008 | Arons | G06F 11/3604 714/38.1 |
| 2008/0306986 A1 | 12/2008 | Doyle, Sr. | |
| 2009/0064091 A1 | 3/2009 | Tonkin et al. | |
| 2009/0164491 A1* | 6/2009 | Cotichini | G06F 17/303 |
| 2010/0107119 A1* | 4/2010 | Libert | G06F 17/30126 715/810 |
| 2011/0270597 A1 | 11/2011 | Baumgartner et al. | |
| 2013/0339185 A1* | 12/2013 | Johnson | H04W 4/02 705/26.8 |
| 2014/0372992 A1* | 12/2014 | Yoon | G06F 8/447 717/137 |
| 2015/0040097 A1* | 2/2015 | Martin | G06F 8/10 717/105 |
| 2015/0089063 A1 | 3/2015 | Soni et al. | |
| 2015/0331681 A1* | 11/2015 | Rose | G06F 8/437 717/143 |
| 2016/0070724 A1* | 3/2016 | Marrelli | G06F 17/30303 707/692 |
| 2017/0116007 A1* | 4/2017 | Cimadamore | G06F 8/315 |

OTHER PUBLICATIONS

IBM Resource Access Control Facility (RACF), Resource Access Control Facility (Jun. 2016, 1 pg.).
Application Analyzer: Technology Suite: TCS Master Craft: Offerings: Home (2 pgs.), retrieved from https://archive.org/web/ (Wayback Machine) with date of Jan. 22, 2014.
Rule Extraction Workbench: Transform Suite: TCS Master Craft: Offerings: TCS (2 pgs.), retrieved on-line on Oct. 15, 2015.
Application Transformer: Transform Suite: TCS Master Craft: Offerings: Home (1 pgs.), retrieved from https://archive.org/web/ (Wayback Machine) with date of Jan. 22, 2014.
Application Analysis and Visualization—Micro Focus Enterprise Analyzer (2 pgs.), retrieved from https://archive.org/web/ (Wayback Machine) with date of Jan. 16, 2014.
Metalogic Systems, "Insight AMS" (2 pgs.), retrieved from https://archive.org/web/ (Wayback Machine) with date of Mar. 16, 2014.
Eranca "Solution" (5 pgs.), dated Mar. 10, 2015.
Accenture "Accenture Cloud Application Migration Services", A smarter way to get to the cloud (8 pgs.), dated 2014.
IBM Tivoli Workload Scheduler, User's Guide and Reference, Version 9, Release 2 (836 pgs.), dated 2014.
CA Workload Automation CA 7 Edition, CA Technologies (8 pgs.), retrieved from https://archive.org/web/ (Wayback Machine) with date of Feb. 24, 2016.
What's New in BMC Control-M 8, Product Data Sheet, (2 pgs.), dated Oct. 2012.
CA Unified Infrastructure Management—CA Technologies (6 pgs.), retrieved from https://archive.org/web/ (Wayback Machine) with date of Apr. 21, 2014.
IBM Resource Access Control Facility (RACF), Resource Access Control Facility (1 pg), dated Nov. 2008.
CA Top Secret—CA Technologies, Ensure Scalable and Streamlined Mainframe Security (7 pgs.), dated Jul. 29, 2015.
CA ACF2 for z/0s, Quick Reference Guide (r 12) (3rd Edition, 101 pgs.), dated 2009.
Active Directory, Chapter 11 from Introducing Windows 2000 Server, Microsoft Press (14 pgs.), dated Dec. 9, 2009.
CA View—CA Technologies (6 pgs.), retrieved from https://archive.org/web/ (Wayback Machine) with date of Feb. 20, 2016.
CA Deliver—CA Technologies (6 pgs.), retrieved from https://archive.org/web/ (Wayback Machine) with date of Feb. 27, 2016.
IBM FileNet P8 Platform V 5.2.1 publication library (4 pg.), retrieved from https://archive.org/web/ (Wayback Machine) with date of Feb. 17, 2015.
Virtual Machinery—Sidebar 2—The Halstead Metrics (4 pgs.), retrieved from https://archive.org/web/ (Wayback Machine) with date of Sep. 23, 2014.
McCabe Cyclomatic Complexity (2 pgs.), retrieved from https://archive.org/web/ (Wayback Machine) with date of May 15, 2014.

* cited by examiner

METHOD AND APPARATUS FOR MIGRATION OF APPLICATION SOURCE CODE

CROSS REFERENCE TO RELATED APPLICATION

This application claims the benefit of, and priority to, U.S. Patent Application No. 62/441,785, filed Jan. 3, 2017 (the '785 application) and U.S. Patent Application No. 62/274,488, filed Jan. 4, 2016 (the '488 application). The '785 application and the '488 application are hereby incorporated by reference as though fully set forth herein.

TECHNICAL FIELD

The present disclosure relates generally to a method and apparatus for migration of application source code, and more particularly to a method and apparatus for migration of such source code from a first format to a second format.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

There is a desire for current or modern computer systems running applications to be agile, proactive, flexible and prescriptive in real-time. Modernizing legacy applications may resolve these problems and may help users migrate applications to modern applications that may offer cloud adoption, digital and analytical capabilities. Some challenges in analyzing legacy applications may include the amount of time required to migrate legacy systems and the related impact on business operations, including costs and personnel requirements, errors may creep into a manual migration method increasing the risks to business operations, and the ability to find the right resources to perform migration of legacy applications.

There is, therefore, a need for solutions that allow migration from legacy applications to modern applications. The foregoing discussion is intended only to illustrate aspects of the present field and should not be taken as a disavowal of claim scope.

SUMMARY

In embodiments, a system and method for migration of application source code may include a method of selecting at least one application. In embodiments, the method may include parsing the source code in an original language and generating a first output. In embodiments, the method may include dynamically analyzing the source code in the original language to produce a second output wherein the second output comprises runtime metadata associated with the selected at least one application. In embodiments, the method may include converting, using said first output and said second output comprising runtime metadata, at least one of the source code of the selected application in an original language to a destination language on the second platform and a data source in an assigned format to a destination format. Other methods, systems, and apparatus descriptions and/or embodiments are also presented herein.

Aspects, features, details, utilities, and advantages of embodiments of the present disclosure will be apparent from reading the following description and claims, and from reviewing the accompanying drawings.

DETAILED DESCRIPTION

Figure 1:
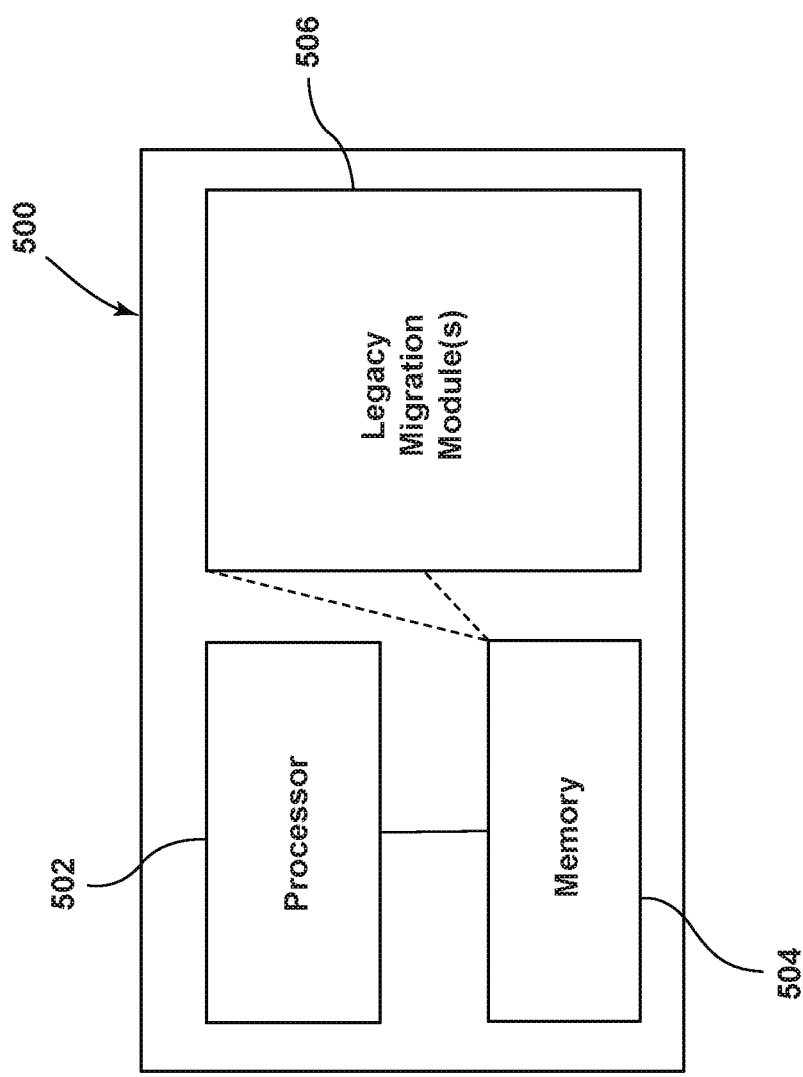
FIG. 1 is a block diagram generally illustrating an embodiment of a legacy migration tool in accordance with teachings of the present disclosure.

Legacy software is deeply embedded in customer organizations with extreme complexity. There are plethora of problems with such legacy applications, like the lack of agility, skills shortage, high costs of ownership, and increasingly complex regulatory compliance standards. In the new digital era, having information technology (IT) systems that are agile, proactive, flexible and prescriptive in real time is the key to business growth.

Legacy modernization provides solutions to all these problems and helps the customer get into a non-legacy distributed platform, for example, with enablement for cloud adoption, as well as digital and analytics capabilities. Customers typically face a number of challenges in maintaining business rules, such as, for example only, (i) migration of legacy applications and/or systems is a time consuming task. Migration undergoes phases such as analysis, data migration, and application migration. The manual process of execution may be too time consuming to be cost effective; (ii) errors can creep into manual process of migration due to the manual method of execution, resulting in increased risk to the application owners; (iii) generally migration is conducted on legacy technologies and finding the proper resources is a challenge; (iv) finalizing the scope to derive the future roadmap (for the migrated applications); and (v) extracting the current business functionality from the application portfolio to design the new modern system.

Embodiments consistent with the instant teachings provide solutions to one or more of the above-identified challenges. Embodiments provide a migration tool platform to migrate a legacy application to a modern application.

Embodiments of the legacy migration tool facilitate reverse engineering in an automated and/or semi-automated approach. Embodiments of the legacy migration tool include features such as automated accelerators for analysis, language conversions and data/database migrations. Embodiments of the legacy migration tool include features such as ecosystem migration accelerators that include scheduler, security, output management, monitoring migration from the legacy platform. Embodiments of the legacy migration tool include features such as inventory analysis and cloud onboarding, and is an automated approach to drastically reducing human effort. Embodiments of the legacy migration tool include features such as generating different projects based on the business functionalities/application (e.g., sales, purchasing, marketing), and uploading the source code based on the classifications. Embodiments of the legacy migration tool include support of both role-based and subscription-based execution on the technology and lines of code to be analyzed.

Additionally, embodiments of a legacy migration tool handle a plurality of legacy computer programming languages, such as but not limited to Common Business Oriented Language (COBOL), Programming Language One (PL/1), Natural, Assembler, Coolgen, VisualBasic 5 (VB5), Job Control Language (JCL), and the like. In an embodiment, the legacy migration tool may be implemented as "Software as a Service" (SaaS) model. In such a delivery model, a customer can select and subscribe to different legacy languages based on the technology stack in their current enterprise IT portfolio.

Additionally, the design of the legacy migration tool may comprise a plug and play framework platform, which helps integrating the new tool feature without disturbing the existing features. There is no limitation in the framework, it allows to integrate different open source tools quickly with little/no effort. The "On Premise installation" of an embodiment of the legacy migration tool may be configured to help customers to avoid bringing source code base out of their enterprise network due to security reasons.

In general, embodiments of the legacy migration tool are configured to migrate legacy applications automatically and/or semi-automatically. In addition to mainframe technologies like COBOL, Customer Information Control System (CICS), Information Management System (IMS), DataBase 2 (DB2), Coolgen, Virtual Storage Access Method (VSAM) and the like, embodiments of the legacy migration tool also support JAVA, C, C++, VisualBasic 6 (VB6), VB .NET, C# ("C Sharp") applications. Embodiments of the legacy migration tool also include features such as, for example, seed search analysis, rule de-duplication, flowchart and multi-flowchart generation that assists users in understanding the program flow and/or assisting in the legacy migration process.

Before proceeding to a detailed description of various embodiments of a legacy migration tool, a general overview of a larger legacy migration system will first be set forth in order to provide context in which the legacy migration tool resides.

FIG. 1 is a simplified block diagram of a computer-implemented system 500, in an embodiment, for migrating legacy applications to a new, modern computing platform. In the illustrated embodiment, system 500 may include one or more processors 502, a memory 504, a variety of input/output mechanisms (not shown) such as a display, a microphone, a speaker, and a network interface (wired or wireless), and a legacy migration module (or modules) 506 configured generally to facilitate migration of legacy computer programs/applications.

Processor 502 is configured generally to control the overall operation of system 500, including coordination and cooperation among and between the other components of system 500. In an embodiment, processor 502 is configured to execute a suitable operating system. Processor 502 may include a central processing unit (CPU), memory (in addition to or such as the illustrated memory 504) and an input/output (I/O) interface through which processor 502 may receive a plurality of input signals and to generate a plurality of output signals.

Memory 504 is provided for storage of data and instructions or code (i.e., software) for processor 502. Memory 504 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although illustrated as a separate component in the illustrated embodiment, it should be understood that memory 504 may be internal to processor 502.

Legacy Migration.

Legacy migration module(s) 506 may include application programs stored in memory 504 and configured for execution by one or more processors 502, to achieve an overall function of legacy computer system migration. Generally, legacy migration module(s) 506 provides an accelerator platform for hosting various migration and modernization tools, and may include a modernization lifecycle based platform that facilitates a user migrating out of a legacy environment in a de-risked and accelerated way.

Legacy migration module(s) 506 may include the following components and/or layers. Generally, legacy migration module(s) 506 include a presentation layer, a service layer, a business layer, an integration layer, a data access layer, and a security layer. The presentation layer includes views that are built with Hypertext Markup Language 5 (HTML5) User Interface (UI) with Cascading Style Sheets 3 (CSS3) and jQuery UI elements via a bootstrap network. The data elements are pushed from the controllers into the view via models. Velocity templating engines are used for generating the menus. The service layer includes an application that exposes various services for maintaining the data sanity between the clients and the servers. The business layer includes the SaaS logic for utilizing various tools built with the experienced project execution and automation of the predictable work. The integration layer allows the tools to run in online/batch mode based on the time estimates for the successful completion. The users are kept updated via the email messages to ensure optimized time utilization for the end users. The data access layer includes hibernated entities that were used for the optimized effort utilization of the developer to allow them to focus on the core customer problems instead of the standard routine application problem. The security layer includes a spring security Application Program Interface (API) that is leveraged for interfacing with Lightweight Directory Access Protocol (LDAP) servers and controlling the usage of the features that the portal has to offer the user.

Figure 2:
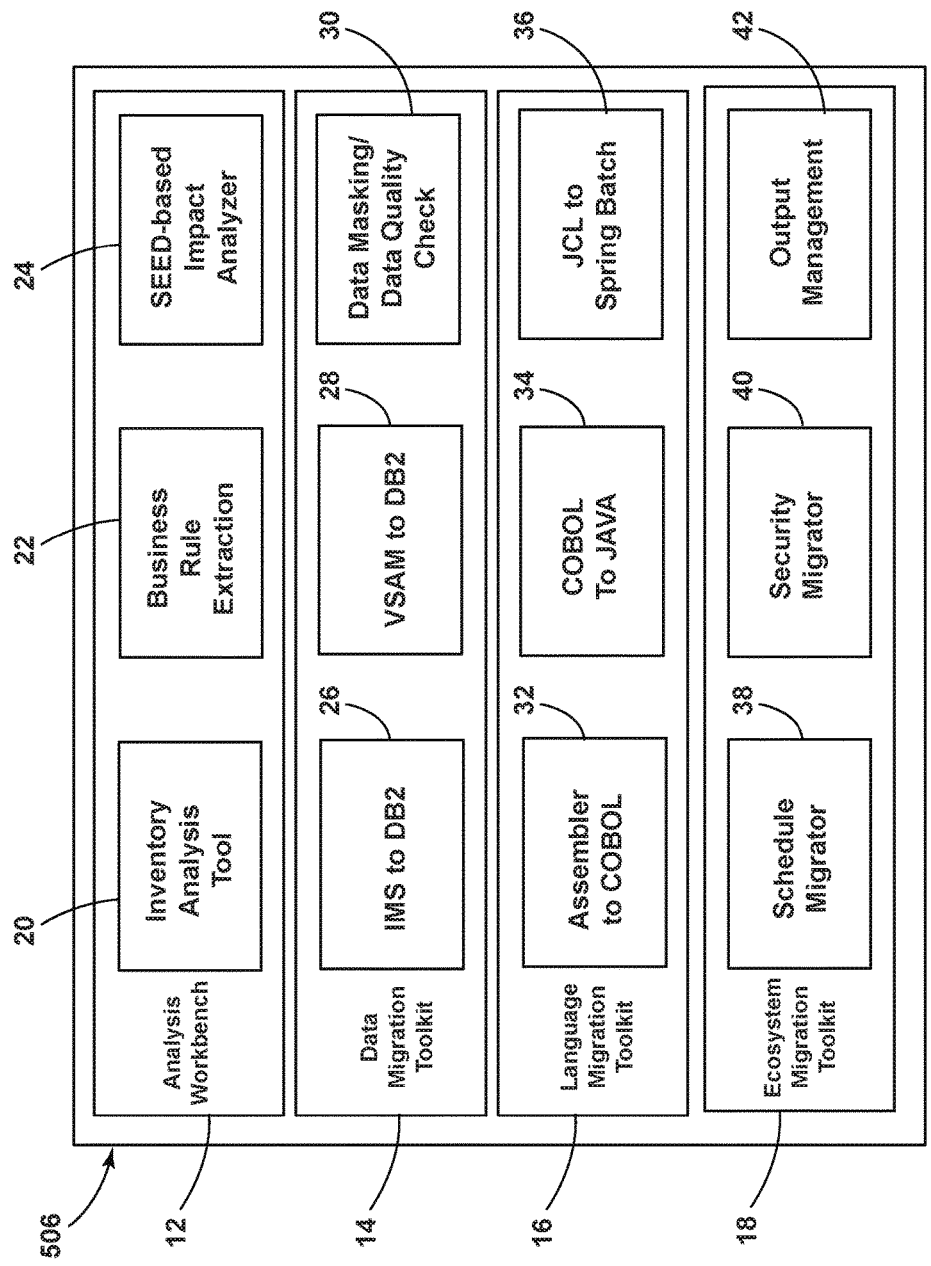
FIG. 2 is a block diagram generally illustrating in greater detail the legacy migration tool of FIG. 1.

In the illustrated embodiment, FIG. 2 is a simplified block diagram showing, in greater detail, the various functional module(s) included in legacy migration module 506. In this regard, legacy migration module(s) 506 may include one or more workbenches and/or toolkits that may contain one or more applications, tools, and/or modules (hereafter, the terms "applications", "tools", and "modules" may be used interchangeably), such as, but not limited to, an analysis workbench 12, a data migration toolkit 14, a language migration toolkit 16, and/or an ecosystem migration toolkit 18. It should be understood that each of the referred-to applications, tools, toolkits, workbench(es), and/or modules may comprise software stored in memory 504 and configured for execution by one or more processors 502.

Legacy migration module(s) 506 may be configured as a SaaS, where users (e.g., customers), may subscribe (e.g., enroll), in one or more of the application toolkits 12, 14, and/or 16 described above. Users may configure one or more subscriptions to application to legacy migration module(s) according to predetermined attributes (e.g., cost, size, volume, and duration of usage). Legacy migration module(s) 506 may be configured to be accessed by way of the web (e.g., Internet), using a conventional web browser, or alternatively, can be configured as an "on premises installation" via hard copy installation.

Legacy migration module(s) 506 ("Exit Legacy") include a feature to check for a user subscription for a tool that is intended to be used for a given project/customer combination. The tool will be listed as a valid option if the subscription is active and/or available. The component inventory will be displayed to the user according to the subscription. The user is allowed to select one or multiple components and the source files for the component. The legacy migration module(s) 506 executes the specified tool in the background which in turn loads the sources from the selected component inventory and performs the steps according to the tool. Tables are created/updated in the Exit Legacy database with the relevant information. Reports are prepared and modified/new sources are generated based on the parsed sources of the selected components.

Analysis Workbench.

With continued reference to FIG. 2, analysis workbench 12 may include one or more applications such as, but not limited to, an inventory analysis tool 20 (hereinafter "IAT 20"), a business rule extraction tool 22 (hereinafter "BRE 22"), and/or a seed-based impact analyzer tool 24. TAT 20 is configured generally as an inventory analysis tool platform to extract inventory of the code by way of analysis in an automated and semi-automated way, the details of which are set forth in co-pending U.S. application Ser. No. 15/397,492, filed on Jan. 3, 2017, hereby incorporated by reference as though fully set forth herein.

TAT 20 provides interactive analysis of the legacy inventory to provide volumetric and complexity analysis, job flow details and code quality reports. TAT 20 allows business module classification to determine module level complexity. In addition to mainframe technologies like COBOL, CICS, IMS, DB2, Coolgen, Natural, Adaptable Database System (ADABAS), PL/1, Assembler, FOCUS (computer programming language), and VSAM, the TAT 20 also supports JAVA, C, C++, VB6, VB.NET, JCL, and Procs and Control Cards, Job schedulers (CONTROL M and CA7), and C Net applications. The design of TAT 20 allows multiple language inventory to be analyzed simultaneously. TAT 20 also assists in sizing the database and/or files. TAT 20 includes natural language processing (NLP) based query facility to allow users to ask English language questions to get relevant answers.

TAT 20 processes code inventory analysis with tuned heuristic algorithms. The algorithms perform dynamic and static analysis of the source/inventory files, using a simulation environment to check the source code while it executes, capturing the program call chains, dynamic calls, unused variables and obsolete programs using memory forensic analysis to get the dynamically called program name. Simulating the environment not only captures the dynamic values, but also the file/database tables and related file/database operations. This ensures 100% coverage of the program flow path. In TAT 20, dynamic code analysis is used to interpret (e.g., understand) the static and dynamic program calls to gather (e.g., collect) the application program flow and/or generate a call tree report. The call tree report gives the user detailed information about all the calls and called program(s) with screens, databases, and files used.

In IAT 20, the volumetric and cyclomatic complexity calculation algorithms are based at least in part on Halstead and/or McCabe's Algorithms. For example, the following formula is used to calculate the cyclomatic complexity M:

$M=E-N+P$, where

E=number of edges in the flow graph,
N=number of nodes in the flow graph,
P=number of nodes that have exit points.

The above cyclomatic formula is extended in such a way to calculate the maintainability index of the program as well as to derive the number of database calls, screens, and/or file handling to provide accurate information regarding the complexity of the program and/or the maintainability index. The above said process is specific to Exit Legacy. Dynamic outputs are used in a later stage to test the newly created code. Various data sets are prepared which will trigger the business rules that have been identified along with the expected results. The test cases are executed for the new application to determine the sanctity of migration.

In IAT 20, source code undergoes both static and dynamic analysis. Static analysis and static output helps to document a series of conditional execution for each source code decision path. Dynamic analysis and outputs are used after static analysis to test the newly created code. Various data sets are prepared by IAT 20 that trigger inventory, language, or business rules in the source code that have been identified via analysis together with the expected results. The test cases generated by IAT 20 are executed (e.g., simulated) for the new application to verify the migration.

The user executes IAT 20 via the GUI and IAT 20 generates various reports (e.g., inventory reports). The IAT 20 is executed only if the user has a subscription for the IAT 20. When IAT 20 is executed, it will first check the "bought Capacity" table to determine whether the subscribed lines of code limit has been reached. This is the initial check by IAT 20 and IAT 20 will execute accordingly. When the IAT 20 limit is exceeded, IAT 20 execution will terminate and the status of IAT 20 will be updated as "OVERLIMIT".

IAT 20 covers many language specific code logic, invoking the rules from a code quality rules repository. IAT 20 will list the source for the components for which the user has subscribed, if the user has subscribed to IAT 20. IAT 20 allows the user to select the set of sources for the given component to perform inventory analysis. The IAT 20 option triggers a separate thread to go through the selected component options and execute the parsing and analysis steps on the selected sources. These steps are based on a set of predefined rules for the given component type. IAT 20 captures the analysis outcome in specific tables defined to capture data for the given component's analysis and/or creates a database for analysis reports.

Business Rule Extraction Tool.

BRE 22 provides analysis of the legacy code to extract business rules automatically and/or semi-automatically. In addition to mainframe technologies like COBOL, CICS, PL/1, IMS, DB2, Coolgen, Natural, ADABAS, AB-Initio, Assembler, VSAM, and the like, BRE 22 also supports JAVA, C, C++, VB6, VB .NET, C# applications. BRE 22 is configured generally as a business rule extraction tool platform to extract business rules from the code by way of analysis in an automated and semi-automated way, the details of which are set forth in co-pending U.S. application Ser. No. 15/397,486, filed on Jan. 3, 2017, hereby incorporated by reference as though fully set forth herein.

BRE 22 provides an interactive interface to extract and externalize the business rules of any application coded in COBOL, Assembler, JAVA, Ab-Initio, Natural, C, C++, VB6, VB.NET, and C#. BRE 22 produces downloadable reports that can be filtered by business function and programs. BRE 22 also provides a program flowchart for a user to track program flow and its business rules extraction.

BRE 22 includes an impact analyzer tool that does a seed based analysis on keywords to identify all impacted components of an application inventory. As part of the BRE 22, an Artificial Neural Network is used to resolve file names and/or determine combinations of seeds. The Artificial Neural Network is a computational model used to interpret the structure of the application and/or functional behavior of the application system. The computational model helps the BRE 22 to interpret behavioral change of the application during runtime. The computational model is generally a non-linear statistical data modeling tool where complex relationships between the inputs and outputs are modeled and/or patterns are found.

The term "seed" refers to any local memory variables defined in the program and being used for the computations and/or for impact analysis. Seed variable is generally an input data element, determined by business and IT analyst. The tool Analyze to gather the direct and indirect pact of the Seed. Seed search is useful to understand usability and flow of this element across application. Seed search reflects which sections of programs in the inventory this data elements has been processed or used, this information is the basis to segregate sections of inventory for relevant and irrelevant business rules extraction.

The design of BRE 22, in an embodiment, (i) extracts business rules from the program automatically and saves the extracted business rules in a database; (ii) searches the program inventory for the seed search term entered by the user and displays the result; (iii) dynamically executes all of the source code, line by line, that may have been missed by static analysis; (iv) eliminates duplicate business rules that have been extracted and saved to the database; (v) analyzes the source code and displays the program flow; (vi) converts the business logic present in the program and generates English language versions of the business rules; (vii) allow a user to add a copybook variable, comment on a line of code, replace a line of code, and add new code; (viii) capture program logic flow and display the flow to the user; (ix) display and/or download a flowchart.

Figure 3:
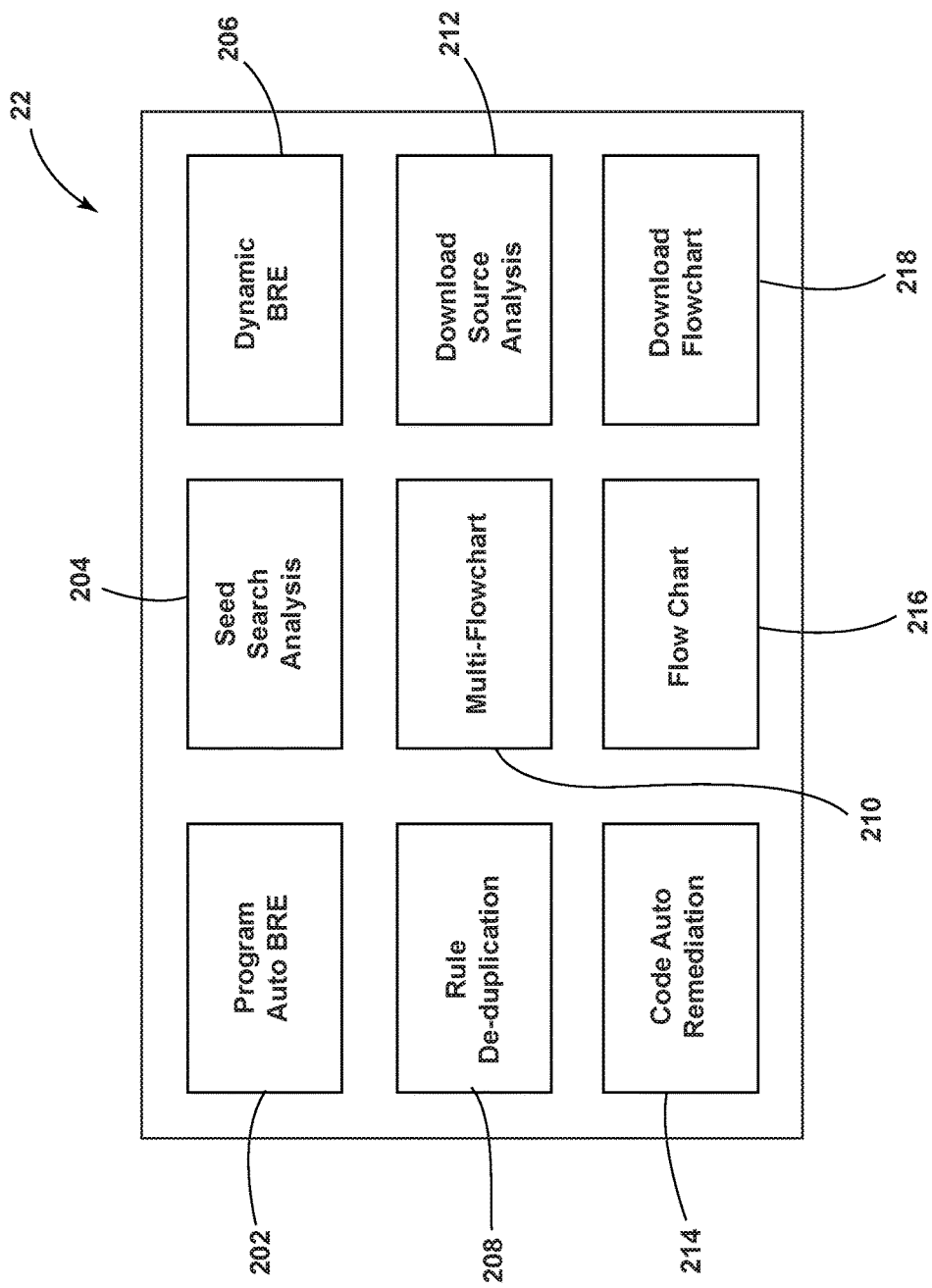
FIG. 3 is a block diagram generally illustrating an embodiment of a business rule extraction tool in accordance with teachings of the present disclosure.

FIG. 3 is a simplified block diagram showing, in greater detail, various functional blocks including in the BRE 22. As noted above, BRE 22 may be configured to extract business rules from the program (e.g., source code) automatically and may be configured to save the extracted business rules in a database. In embodiments, BRE 22 may be configured to search the program inventory for the seed search term entered by the user and may be configured to display the result. In embodiments, BRE 22 may be configured to dynamically execute all of the source code, line by line, that may have been missed by static analysis. In embodiments, BRE 22 may be configured to eliminate duplicate business rules that have been extracted and saved to the database. In embodiments, BRE 22 may be configured to analyze the source code and display the program flow. In embodiments, BRE 22 may be configured to convert the business logic present in the program and generates English language versions of the business rules. In embodiments, BRE 22 may be configured to allow a user to add a copybook variable, comment on a line of code, replace a line of code, and add new code. In embodiments, BRE 22 may be configured to capture program logic flow and display the flow to the user. In embodiments, BRE 22 may be configured to display and/or download a flowchart.

BRE 22 includes, generally, a program auto BRE module 202, a seed search analysis module 204, a dynamic BRE module 206, a rule de-duplication module 208, a multi-flowchart generator 210, a download source analysis module 212, a code auto remediation module 214, a flowchart generator 216, and a download flowchart module 218.

The program auto BRE module 202 comprises (i) a means or mechanism for extracting the business rules from the source code automatically or semi-automatically and saves the extracted business rules in a database; (ii) a means or mechanism for downloading the extracted business rules in formats such as, Excel and/or Portable Document Format (PDF); (iii) a means or mechanism for parsing the source code into the database; (iv) a means or mechanism for removing un-parseable characters of the source code; (v) a means or mechanism for formatting the parsed source code; (vi) a means or mechanism for classifying the parsed source code; (vii) a means or mechanism for identifying logical conditions and the child statements of the logical conditions; and (viii) a means or mechanism for providing the logical and child statements to the user.

The seed search analysis module 204 comprises (i) a means or mechanism for searching the source code inventory for the seed entered and displays the result(s) to the user; (ii) a means or mechanism for searching for the seed that matches exactly with the variables in the source code inventory and displays the result(s) to the user. The term "seed" refers to any local memory variables defined in the program and being used for the computations and/or for impact analysis. A seed is a technical variable used in the inventory which represents a business element (e.g., Policy Start Date: 'POL-ST-DT', Account number: 'ACC-NUM').

A seed variable is generally an input data element, determined by business and IT analyst. Seed search is useful to understand usability and flow of this element across application. Seed search reflects which sections of programs in the inventory this data elements has been processed or used, this information is the basis to segregate sections of inventory for relevant and irrelevant business rules extraction and also to understand the how value of the variables are set and understand various computational process that changes the value of the variables.

The importance of seed search is to understand how the value of the variables get populated/processed and what all are the different steps that it undergo for the same. also how the reference variables gets impacted. The main objective of seed search to identify the programs that gets impacted if the length of variables needs change during regulatory reform changes.

The seed matching the variables in the source code inventory is displayed and the program(s) that include the seed are displayed; (iii) a means or mechanism for searching for the seed that matches partially with the variables in the source code inventory and displays the result(s) to the user. The seed matching the variables in the source code inventory is displayed and the program(s) that include the seed are displayed; (iv) a means or mechanism for searching for a base seed and a reference seed that matches exactly with the variables in the source code inventory and displays the result(s) to the user. The seed matching the variables in the source code inventory is displayed and the program(s) that include the seed are displayed; and (v) a means or mechanism for searching for a base seed and a reference seed that matches partially with the variables in the source code inventory and displays the result(s) to the user. The seed matching the variables in the source code inventory is displayed and the program(s) that include the seed are displayed. In embodiments, a user enters a seed variable and selects one or more options as described above. The program parses the input inventory folder for the seed variable and/or impacted variable. In the case of an indirect seed search, the program does a recursive search and finds the impact variable of the reference seed. The program writes the results of the search to a report stored in the database. The program displays the results to the user via the view report tool option.

Seed search analysis is a tool that searches the program inventory for the seed entered on the tool and displays the result to the user. The seed search analysis tool has different combinations depending on type of impact and type of search for searching the program inventory as mentioned below.

Type of Impact—Direct, Type of search—Exact. The tool searches for the seed that matches exactly with the variables in program inventory and displays the results to the user. The seed matching the variables in the program inventory is displayed and also the program that the seed is present is displayed. The impacted variable of the seed is also displayed.

Type of Impact—Direct, Type of search—Generic. The tool searches for the seed that matches partially with the variables in program inventory and displays the results to the user. The seed matching the variables in the program inventory is displayed and also the program that the seed is present is displayed.

Type of Impact—Indirect, Type of search—Exact. The tool searches for the base seed and also the reference seed that matches exactly with the variables in program inventory and displays the results to the user. The seed matching the variables in the program inventory is displayed and also the program that the seed is present is displayed.

Type of Impact—Indirect, Type of search—Generic. The tool searches for the base seed and also the reference seed that matches partially with the variables in program inventory and displays the results to the user. The seed matching the variables in the program inventory is displayed and also the program that the seed is present is displayed.

The technical design steps involved in execution of the Seed Search analysis is mentioned below (i) Enter Seed variable and select options as mentioned above; (ii) Program parses the input inventory folder for the SEED variable and impacted variable; (iii) For indirect Seed search program does recursive search and finds the impacted variable of the reference seed; (iv) Results are written to the report in database; and (v) Results can be viewed using the view report tool option.

The dynamic BRE module 206 comprises (i) a means or mechanism for dynamically executing the source code line-by-line to include any lines that may have been missed by static analysis. The execution covers all of the source code (e.g., COBOL) that may not be possible to include in static analysis, including all of the logical paths of the source code; (ii) a means and mechanism for uploading the source code coverage report to legacy migration module 506; (iii) a means or mechanism for parsing the source code coverage report; (iv) a means or mechanism for checking the quantity of the source code tested using an identifier in the code coverage report; (v) a means or mechanism for producing an Excel file and/or a pie chart that displays the status of each line of source code; and (vi) a means or mechanism for generating a report that displays that execution status of each line of source code. In embodiments, the user uploads the code coverage report to the Exit Legacy tool generated by the mainframe. The Exit Legacy tool parses the code coverage report. The Exit Legacy tool checks how much code has been tested by way of an identifier in the code coverage report. The Exit Legacy tool produces an Excel file together with a pie chart that displays the status of each line of code. The user can view the report via the BRE 22 tool window that displays with an identifier that shows which code has been executed (e.g., simulated) or not executed (e.g., not simulated). In BRE 22, dynamic code analysis extracts all of the branch paths of the programs based on the test data provided to the simulated program execution. BRE 22 ensures that all of the business rules are extracted and 100% of the source code coverage is achieved. Dynamic code analysis of BRE 22 can be an iterative process, when gaps in the source code are identified, new test cases are created for the identified gap and re-executed (e.g., re-simulated) to confirm that all of the gaps are covered.

The rule de-duplication module 208 comprises (i) a means or mechanism for eliminating duplicate business rules and that were extracted and saved to the database; (ii) a means or mechanism for parsing the extracted business rules; and (iii) a means or mechanism for determining whether an extracted business rule matches any other extracted business rule. If the extracted business rule matches any other extracted business rule by more than a predetermined amount (e.g., 50%), the business rule is identified (e.g., highlighted), and displayed to the user.

The multi-flowchart generator 210 comprises a means or mechanism for analyzing the source code and displaying the program flow on the Exit Legacy tool with the option to expand the flowchart for the paragraph on the click of the button. The tool parses the source code and merging lines of code based on COBOL keywords. The tool creates a multimap with section names as the key and executable code as the value(s). The tool creates a variable map and parses the working storage section, making a list of all possible variable names along with their data types. The tool creates a table with a naming convention ("COBOL_FILE_FILE_NAME"). The tool creates a table for each file that flowchart is generated. Columns are defined as "ID(INT)(PK)", "ACTUAL_CODE(CHAR)", "TYPE(CHAR)", "BOX_TYPE(CHAR)", "ORIG_PARA(CHAR)", "EXIT_PARA (CHAR)", "SKIP_EXIT(BOOLEAN)". The tool loops through the code multimap created during parsing of the code. The tool reads the data back from the table and generates multiple flowcharts according to the number of sections the file contains. There will be at least one flowchart that will list all the sections only and list the section that it is linked to. The file name may be ("FILE_NAME_MAIN_graph.html"). The flowchart is used to quickly navigate between different modules. Each section has its own flowchart. Perform statements (e.g., a subroutine in a COBOL program) are linked to other flowcharts containing details of the section called by Perform. The process is similar to "GO TO" statements. The user can navigate between flowcharts using the Perform statements and/or the main graph generated earlier by the tool. The naming convention for the file generated may be ("FILENAME_SECTIONNAME_ graph.html"). The tool generates a text tile for each section that will have the box type, name, color, and/or the linkage between the boxes. A final rendering of the flowchart can be made using Dot.exe provided by Graphviz in .SVG (Scalable Vector Graphics) format.

The download source analysis module 212 comprises (i) a means or mechanism for converting the business logic present in the program and generates English language statements of the extracted business rules to a Word document; (ii) a means or mechanism for parsing the source code of the uploaded program; (iii) a means or mechanism for converting the technical source code into the English language; (iv) a means or mechanism for identifying copybooks used in the program; (v) a means or mechanism for writing the converted source code and identified copybooks to a Word document; (vi) a means or mechanism for a user to download the Word document.

The code auto remediation module 214 comprises (i) a means or mechanism for adding a copybook variable by allowing a user to specify a copybook variable that can be added to the copybook; (ii) a means or mechanism for allowing a user to specify the location in the copybook where the variable needs to be added; (iii) a means or mechanism for allowing the user to specify the existing copybook variable that needs to be replicated for its definition; (iv) a means or mechanism for allowing a user to comment on a specific line of code in the inventory; (v) a means or mechanism for allowing a user to replace a specific line of code with new code in the inventory; (vi) a means or mechanism for allowing a user to add new code in the inventory and to specify the location of the code where the new code is to be inserted; (vii) a means or mechanism for parsing the source code; and (viii) a means or mechanism for implementing the business logic and updating the source code depending on the option selected by the user. In embodiments, the Exit Legacy tool parses the source code from a folder. Depending on the option selected by the user, the tool implements the logic and/or updates the source code in the input folder.

The flowchart generator 216 comprises (i) a means or mechanism for capturing program logic flow; and (ii) a means or mechanism for displaying captured program logic flow in a flowchart.

The download flowchart generator 218 comprises (i) a means or mechanism for downloading a flowchart in PDF format; (ii) a means or mechanism for displaying to the user via a GUI the flowchart and the option to download the flowchart; (iii) a means or mechanism for parsing the source code, generating a flowchart of the source code, and displaying the flowchart to the user; (iv) a means or mechanism for displaying to the user a download flowchart link via the GUI and saving the flowchart in PDF format.

Data Migration Toolkit.

The data migration toolkit 14 may include one or more applications such as, but not limited to, a data migration tool(s) 26, 28 and/or a data masking/data quality check tool 30. Data migration tools 26, 28, and/or 30 support migration from VSAM to DB2, IMS to DB2, and ADABAS to RDBMS. In an embodiment, the IMS to DB2 module 26 may be configured to provide an end-to-end migration solution to migrate data from hierarchical database IMS DB to DB2, for example. The tool 26 may be configured to convert application code modification, Data Definition Language (DDL) for target schema generation, and data migration scripts, may provide intermediate optimization of target schema and re-create the Structure Query Language (SQL) statements and/or may convert the application code (JCL, PROC (JCL Procedure), COBOL) from IMS specific calls to DB2 compliant calls. The VSAM to DB2 database migrator 28 may be configured to provide an end-to-end migration solution to migrate data from files based data source VSAM to DB2. The tool may cover application code modification, DDL for target schema generation, and data migration scripts, provide intermediate optimization of target schema and re-create the SQL statements and/or convert the application code (JCL, PROC, COBOL) from VSAM specific calls to DB2 compliant calls. The database migrator toolkit 14 may be configured to provide one-to-many mapping where the optimizer may also provide abilities to set defaults, allow nulls, change data types and/or optimize the overall design. The database migration tools also generate data migration programs based on the changes made by a user in schema using optimizer. The data masking and data quality check tools 30 provides additional functionality.

The database migration toolkit 14 provides one-to-many mapping. The database migration toolkit 14 features an optimizer that provides abilities to set defaults, allow nulls, change data types and optimize the overall design. The database migration toolkit 14 includes a migrator tool that allows for the creation of new referential integrity between the tables, move the fields between parent and child tables, modify and remove the referential integrity based on the target design. The database migration toolkit 14 also generates the following components based on the changes made by a user in schema using the optimizer tool (i) JCL jobs for running the extract and load data program; (ii) data migration program to extract the data from the legacy system; (iii) DDL statement to setup the target database. The database migration toolkit 14 includes built in intelligence to understand the legacy schema and/or generate first and second level normalized relational database management system (RDBMS) schemas. When the source schema/file structure has an array definition, the data migrator will automatically break the tables into parent and child tables and the relevant referential integrity is created by the database migration toolkit 14.

The database migration toolkit 14 includes a data masking tool to protect sensitive data during database migration. The data masking tool allows propagation of masked data as part of the database migration process.

The database migration toolkit 14 includes a data quality checking tool that allows for pre-quality checks on the data before the data/database is migrated.

Language Migration Toolkit.

Figure 9:
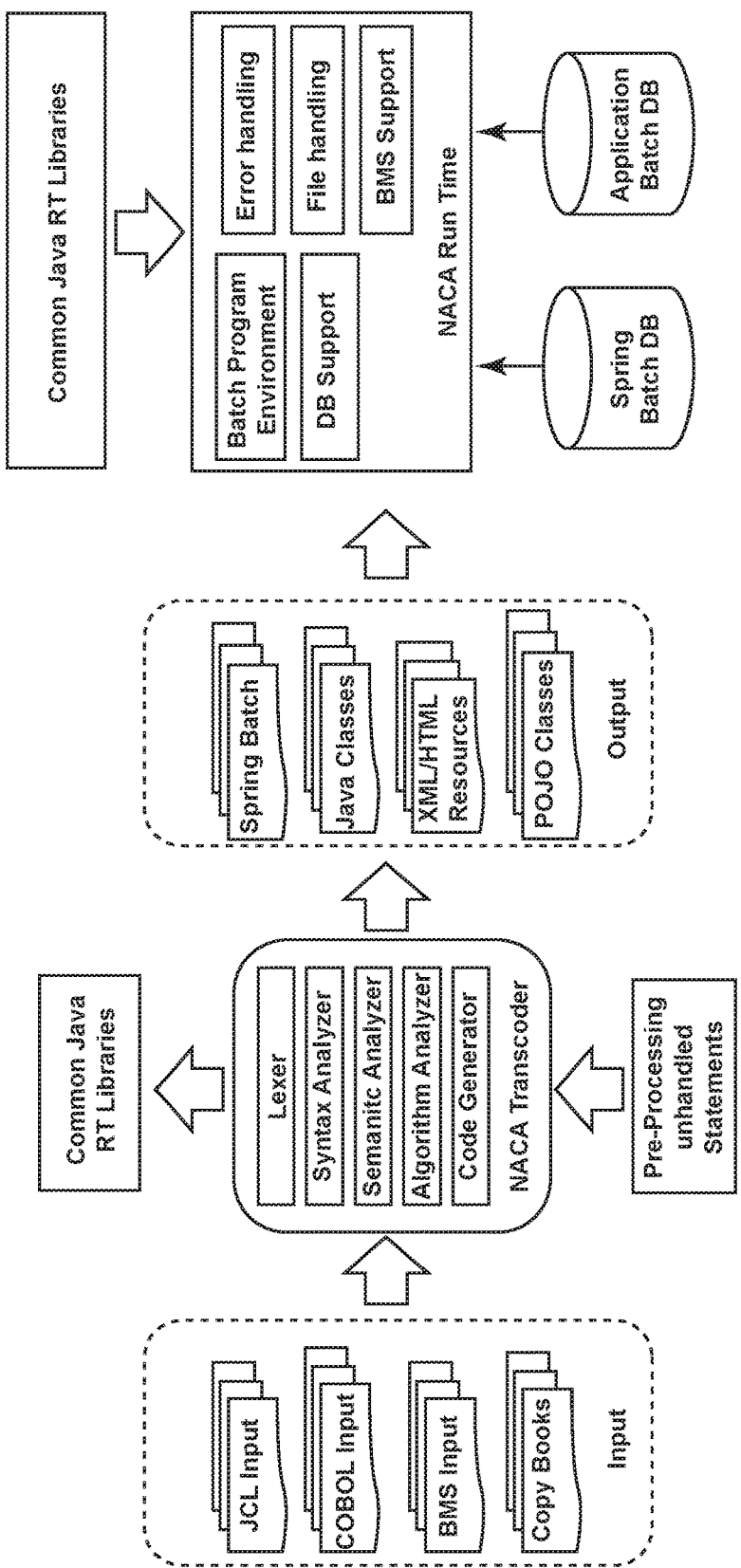
FIG. 9 is a block diagram generally illustrating a high-level operational model of COBOL to JAVA migration module.

The language migration toolkit 16 may include one or more applications such as, but not limited to, an assembler to COBOL tool 32, a COBOL to JAVA/C# tool 34, and/or a JCL to spring/summer batch tool 36, which facilitate conversion of a legacy application configured in a legacy programming language into a modern application configured in a modern programming language. FIG. 9 is a high-level operational model of COBOL to Java migration module. The language migration toolkit supports migration from assembler to COBOL, COBOL to JAVA, COBOL to .Net, PL/1 to JAVA Natural to COBOL, Natural to JAVA, JCL to Spring Batch, and JCL to Summer Batch. The assembler to COBOL tool 32 may be configured to convert Assembler macros and copybooks into COBOL programs, for example, an may cover application code automated migration from second Generation Assembler language to third generation COBOL language, convert assembler copybooks to COBOL copybooks, and/or convert conditional assembly instructions to COBOL statements. Assembler to COBOL tool 32 may be configured to use a unique technique where it is not limited to static code analysis. The assembler to COBOL migration tool 32, in an embodiment, may simulate the assembler execution to resolve the registers and operands as necessary. The COBOL to JAVA/C# tool 34 may be configured to convert COBOL programs into JAVA classes and Copybooks as Plain Old Java Object (POJO) class. The tool 34 may support conversion from CICS COBOL/DB2 to JAVA/Oracle/AngularJS and may also supports file operations, and may be configured to ensure that there are no functional gaps due to automated migration process. Finally, JCL to Spring Batch tool 36 may be configured to convert JCL, COBOL, files to equivalent Eclipse Project containing Spring batch, tasklets, and Java POJO objects, and, may provide pre-built cloud-enabled JAVA utilities that are equivalents of JCL utilities including SORT and database manipulations.

The static parser collects all the language statements of the source legacy programming language and meta data/data dictionary is created. The creation process is called tokenization. Once tokens are extracted from the source legacy language, a data dictionary will get updated with is created where the equivalent target language statements are mapped. During Language migration, The transcoder migrates the legacy source code into the parser reads the source token and replace the line with mapped target language syntax to generate the target language the target language. The parser coverts equivalent line to line source to ensure 100% functional equivalence by simulating the program execution of the migrated application and various data sets are prepared which will trigger the business rules that have been identified along with the expected results. The test cases are executed for the new application to determine the sanctity of migration. The above process is iterative process and multiple increments will get executed until all the gaps are filled.

The language migration toolkit 16 includes a language parser and is compatible with multiple languages. For every language (e.g., COBOL), a specific language parser is needed which is based on the language marker. The language migration toolkit 16 reads the source code from an inventory uploaded by the user. Identification is made on the basis of the inventory component type. A parser is selected based on the inventory component type. Parsing includes steps to traverse the source code in conjunction with the language marker. Parsing steps include the logic of identification of the source code line, categorizing the source code line, and updating a database with relevant information either for next steps and/or for reporting purposes.

In embodiments, dynamic code analysis (e.g., simulation) can be used for business rule extraction and/or multi-program flowchart generation. Dynamic code analysis extracts all of the branch paths of the programs selected by the user based on test data provided to simulate the program(s) execution. Dynamic code analysis ensures that all the business rules are extracted from the all of the source code.

The language migration toolkit 16 includes a language marker that maintains the repository of the language specific keywords and their relationship (e.g., IF, ELSE, and END-IF are interrelated). The language marker builds an inventory map for each keyword which maintains a relationship to other keywords to provide completeness during the parsing of the source code.

The language migration toolkit 16 includes a data dictionary that is a list of the programming language specific keywords. The data dictionary includes an array list which maintains level keywords to be used while parsing the inventory and to identify the language specific keywords.

The language migration toolkit 16 includes a merge/demerge tool to process many languages that do not enforce programming standards (e.g., indentations). In processing a particular program file, it is necessary to bring all the lines of code into a particular format. For example, for IF condition, there can be multiple conditions as part of the IF block. These multiple conditions may span across different lines of the program file. It is necessary to being all the conditions in one line while processing the file. The physical file will not be modified during this process, but the code syntax in memory will be standardized or in database only. The merge/demerge tool includes steps to iterate through the source code from the given files in the inventory. The merge/demerge tool runs through the source file. Based on the language type, the merge/demerge tool makes use of a language marker to identify the relations between the keywords for the given language. The merge/demerge tool is maintained in memory buffer to consolidate all relevant text until encountering a logical end for the statement.

The language migration toolkit 16 includes a code standardization tool that is similar to the merge/demerge tool, as in many cases, there is not an enforced developer level coding standard, so it is necessary to clean up the code files to be able to effectively process the code. The code standardization tool standardizes the code to address coding inconsistencies caused by different coding standards followed by different developers. For example, handling of the non-ASCII (American Standard Code for Information Interchange) characters found in the application code. After code standardization, the keyword mapping rules result in more consistent results.

The language migration toolkit 16 includes a keyword data mapping tool that maps the programming keywords into keyword data maps for efficient categorization and depiction. As in any coding language, different keywords are considered to be part of the same category and would have the same depiction if plotted on a flowchart. For the purposes of mapping, all language and keyword specific fields are mapped to the common categories for standard depiction on any graphical chart and code quality metrics.

The language migration toolkit 16 includes a build code hierarchy tool to handle various groups of keywords (e.g., IF, ELSE, CASE, FOR loop, PARA, METHOD), and to build a code hierarchy based on which the user can identify which code line is the parent and which code line is the child. The build code hierarchy tool accordingly handles and depicts the code blocks in a graph or code quality report. The build code hierarchy tool builds code hierarchy for control flow charts in the application. Based on the control flow charts, elements are linked to depict the program flow.

The language migration toolkit 16 includes a code quality rule tool that is responsible for maintaining the language specific code quality dos and don'ts. The code quality rule tool loads the rule set in memory based on the language sources to analyze. The code quality rule tool compares the source (e.g., single or multiple source lines logically grouped) against the rule set. The code quality rule tool identifies non-compliant source code and updates relevant information in a database. The code quality rule tool generates a report based on the respective table to highlight compliance and non-compliance in the selected sources from the inventory.

The language migration toolkit 16 includes a syntax expander tool that expands the PARA calls into the calling place to ensure that the caller PARA is available and is not missing from being handled in the migration process. If the PARA is missing then the migration would complain about it (e.g., alert the user) and error out (e.g., display an error message). This ensures that the complete inventory is made available to the legacy migration tool. The syntax expander tool reads the source and identifies the PARA(s). The syntax expander tool searches through the same source to look for a PARA definition. The syntax expander tool replaces calls to the PARA with the definition identified (i.e., inline expansion of PARA).

The language migration toolkit 16 includes a split/convert/merge tool to process many languages that do not enforce programming standards (e.g., indentations). In processing a particular program file, it is necessary to bring all the lines of code into a particular format. For example, for IF condition, there can be multiple conditions as part of the IF block. These multiple conditions may span across different lines of the program file. It is necessary to being all the conditions in one line while processing the file. The physical file will not be modified during this process, but the code syntax in memory will be standardized or in database only. The merge/demerge tool includes steps to iterate through the source code from the given files in the inventory. The split/convert/merge tool runs through the source file. Based on the language type, the split/convert/merge tool makes use of a language marker to identify the relations between the keywords for the given language. The split/convert/merge tool is maintained in memory buffer to consolidate all relevant text until encountering a logical end for the statement.

The language migration toolkit 16 includes a tasklet generator tool for spring batch that works on a tasklet basis. A tasklet is a class which has the logic for execution on the input data and generating the output data. The tasklet generator tool JAVA classes would be responsible for executing the actual business logic code within the spring batch framework.

The language migration toolkit 16 includes a re-hosting analyzer tool that recommends if the re-hosting would be an effective migration based on the input. The re-hosting analyzer tool analyzes the input inventory and data to determine if re-hosting is an appropriate solution for the Point Of Arrival (POA), which is the target architecture of the modernized legacy application. The re-hosting analyzer tool also analyzes the unhandled keywords in the newer platform which would require additional effort to handle the unsupported keywords.

The ecosystem migration toolkit 18 may include one or more applications, such as, but not limited to, a scheduler migrator tool 38, a security migrator tool 40, and/or an output management tool 42. For example only, scheduler migrator tool 38 may be configured to migrate legacy schedulers, such as CA-7, Control-M, CA-Unicenter, and the like, to a modern scheduler, like IBM Tivoli Workload Manager. Security migrator tool 40 may be configured to migrate application and system level security (like Resource Access Control Facility (RACF), TopSecret, and Access Control Facility 2 (ACF2)) to security systems for distributed platforms, like Active Directory. Output management tool 42 may be configured to migrate output, content and report management (like CA-View/Deliver, ASG-Mobius, and IBM FileNet).

Figure 4:
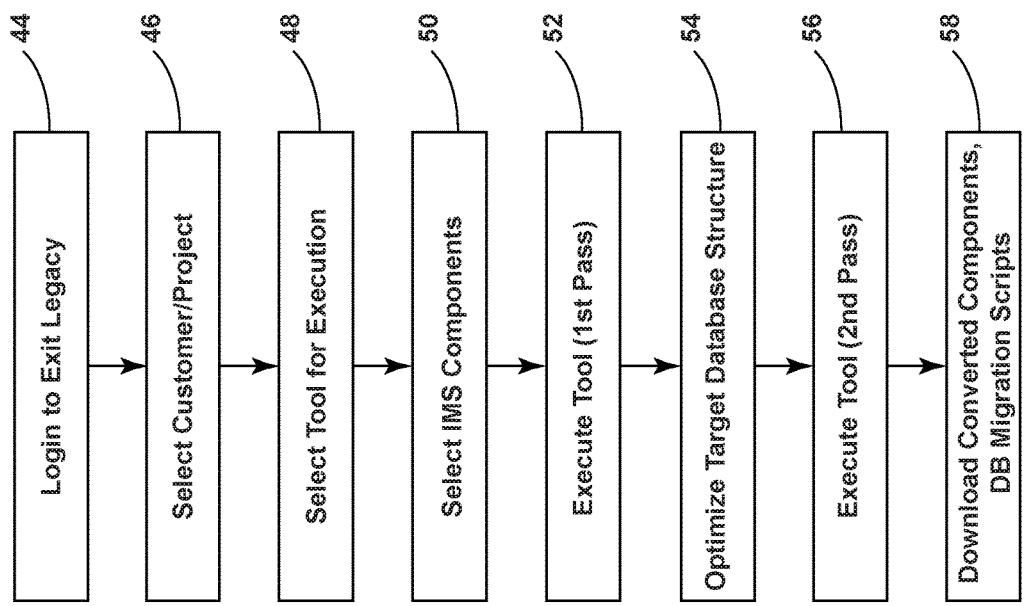
FIG. 4 is a flowchart generally illustrating an embodiment of a method and apparatus for database migration of a legacy application.

FIG. 4 is a high-level flowchart diagram illustrating, in an embodiment, the operation of a method of operation of the database migration toolkit 14 included in the larger legacy migration tool 506. The method begins in step 44.

In step 44, a user may access legacy migration tool 506 by first logging into the legacy migration tool 506 (e.g., "Exit Legacy") via a GUI. The method then proceeds to step 46.

In step 46, the user may select a customer/project via the GUI (e.g., a drop-down list). The method then proceeds to step 48.

In step 48, the user may first select via the GUI one or more toolkits/workbenches available for selection from the legacy migration tool 506 (e.g., see FIG. 2), one or more application workbenches and/or toolkits 12, 14, 16, and/or 18 and/or one or more applications 20, 22, 24, 26, 28, 30, 32, 34, 36, 38, 40, and/or 42 may be displayed via the GUI in step 48. For example, to access the IMS to DB2 migration tool 26, the user selects IMS to DB2 migration tool 26 from the GUI in step 48. It should be understood that toolkits 12, 14, 16, and/or 18 and/or applications 20, 22, 24, 26, 28, 30, 32, 34, 36, 38, 40, and/or 42 displayed to the user via the GUI (e.g., drop down list), and/or may be configured to correspond to a subscription service and/or usage agreement assigned to the user. The method proceeds to step 50.

In step 50, the user selects the IMS components to be migrated from the legacy database. The method then proceeds to step 52.

In step 52, the IMS to DB2 migration tool 26 executes a first pass of the legacy database to be migrated. The method then proceeds to step 54.

In step 54, the IMS to DB2 migration tool 26 optimizes the target database structure of the legacy application. The method then proceeds to step 56.

In step 56, the IMS to DB2 migration tool 26 executes a second pass of the legacy database to be migrated. The method then proceeds to step 58.

In step 58, the IMS to DB2 migration tool 26 provides for the user to download converted components of the legacy database, including database migration scripts.

The IMS to DB2 tool 26 provides an end-to-end migration solution to migrate data from hierarchical database IMS DB to DB2. The IMS to DB2 tool 26 covers application code modification, DDL for target schema generation, and data migration scripts, provides intermediate optimization of target schema and recreates the SQL statements and converts the application code (e.g., JCL, PROC, COBOL) from IMS specific calls to DB2 compliant calls.

The VSAM to DB2 tool 28 provides an end-to-end migration solution to migrate data from files based data source VSAM to DB2. The IMS to DB2 tool 26 covers application code modification, DDL for target schema generation, and data migration scripts, provides intermediate optimization of target schema and recreates the SQL statements and converts the application code (e.g., JCL, PROC, COBOL) from VSAM specific calls to DB2 compliant calls.

The data migration toolkit 14 also provides an end-to-end migration solution to migrate data from inverted list based ADABAS database files to DB2. The data migration toolkit 14 covers application code modification, DDL for target schema generation, and data migration scripts, provides intermediate optimization of target schema and recreates the SQL statements and converts the application code (e.g., JCL, PROC, COBOL) from ADABAS specific calls to DB2 compliant calls.

Figure 5:
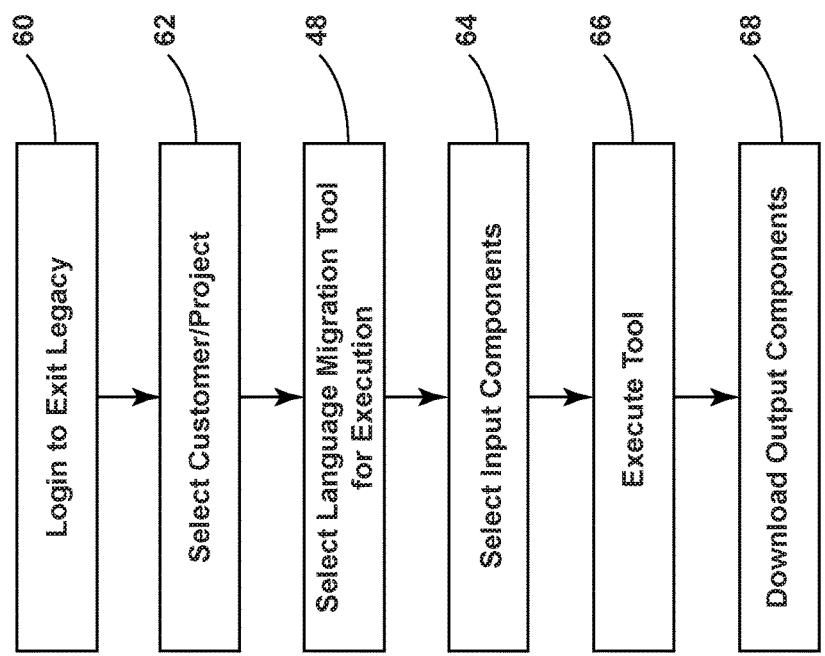
FIG. 5 is a flowchart generally illustrating an embodiment of a method and apparatus for language migration of a legacy application.

FIG. 5 is a high-level flowchart diagram illustrating, in an embodiment, the operation of a method of operation of the language migration toolkit 16 included in the larger legacy migration tool 506. The method begins in step 60.

In step 60, a user may access legacy migration tool 506 by first logging into the legacy migration tool 506 (e.g., "Exit Legacy") via a GUI. The method then proceeds to step 62.

In step 62, the user may select a customer/project via the GUI (e.g., a drop-down list). The method then proceeds to step 48.

In step 48, the user may first select via the GUI one or more toolkits/workbenches available for selection from the legacy migration tool 506 (e.g., see FIG. 2), one or more application workbenches and/or toolkits 12, 14, 16, and/or 18 and/or one or more applications 20, 22, 24, 26, 28, 30, 32, 34, 36, 38, 40, and/or 42 may be displayed via the GUI in step 48). For example, to access the assembler to COBOL migration tool 32, the user selects assembler to COBOL migration tool 32 from the GUI in step 48. It should be understood that toolkits 12, 14, 16, and/or 18 and/or applications 20, 22, 24, 26, 28, 30, 32, 34, 36, 38, 40, and/or 42 displayed to the user via the GUI (e.g., drop down list), and/or may be configured to correspond to a subscription service and/or usage agreement assigned to the user. The method proceeds to step 64.

In step 64, once the user has selected assembler to COBOL migration tool 32 in step 48, the user selects input components for the assembler to COBOL migration tool 32. The method then proceeds to step 66.

In step 66, the assembler to COBOL migration tool 32 executes, parsing the legacy migration source code. The method then proceeds to step 68.

In step 68, the assembler to COBOL migration tool 32 provides for the user to download output components of the language migration.

Figure 6:
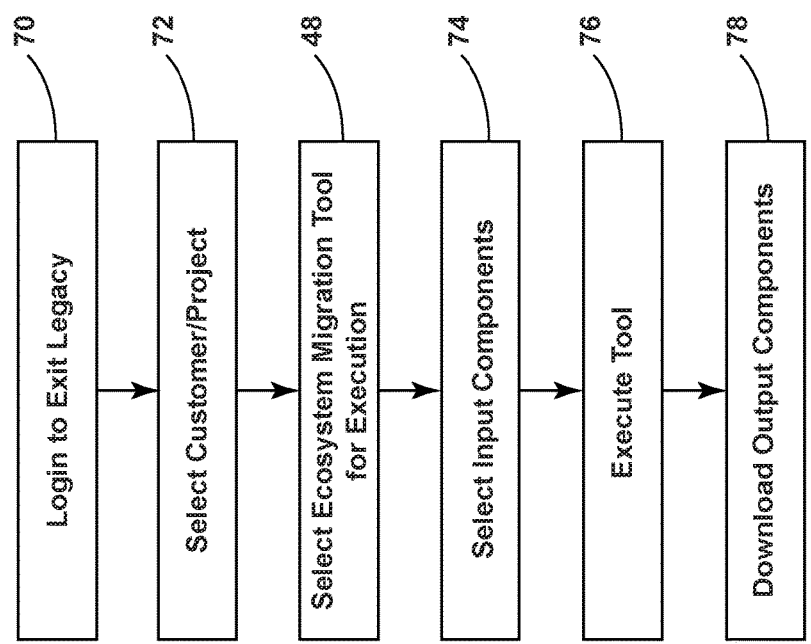
FIG. 6 is a flowchart generally illustrating an embodiment of a method and apparatus for ecosystem migration of a legacy application.

FIG. 6 is a high-level flowchart diagram illustrating, in an embodiment, the operation of a method of operation of the ecosystem migration toolkit 18 included in the larger legacy migration tool 506. The method begins in step 70.

In step 70, a user may access legacy migration tool 506 by first logging into the legacy migration tool 506 (e.g., "Exit Legacy") via a GUI. The method then proceeds to step 72.

In step 72, the user may select a customer/project via the GUI (e.g., a drop-down list). The method then proceeds to step 48.

In step 48, the user may first select via the GUI one or more toolkits/workbenches available for selection from the legacy migration tool 506 (e.g., see FIG. 2), one or more application workbenches and/or toolkits 12, 14, 16, and/or 18 and/or one or more applications 20, 22, 24, 26, 28, 30, 32, 34, 36, 38, 40, and/or 42 may be displayed via the GUI in step 48). For example, to access the scheduler migrator tool 38, the user selects scheduler migrator tool 38 from the GUI in step 48. It should be understood that toolkits 12, 14, 16, and/or 18 and/or applications 20, 22, 24, 26, 28, 30, 32, 34, 36, 38, 40, and/or 42 displayed to the user via the GUI (e.g., drop down list), and/or may be configured to correspond to a subscription service and/or usage agreement assigned to the user. The method proceeds to step 74.

In step 74, once the user has selected the scheduler migrator tool 38 in step 48, the user selects input components for the scheduler migrator tool 38.

In step 76, the scheduler migrator tool 38 executes. The method then proceeds to step 78.

In step 78, the scheduler migrator tool 38 provides for the user to download output components of the language migration.

Figure 7:
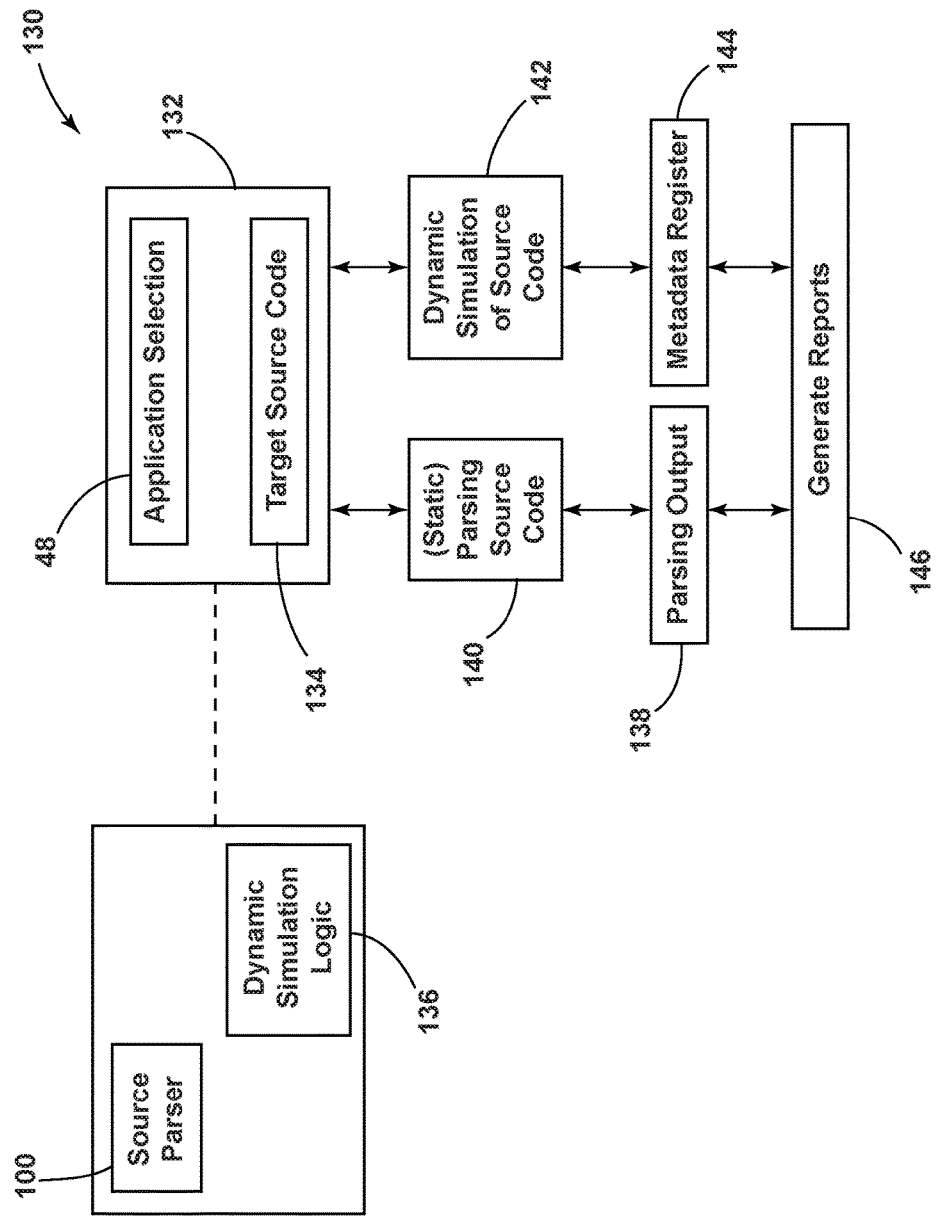
FIG. 7 is a block diagram generally illustrating a dynamic code simulation feature of the method and apparatus for language migration of FIG. 5.

FIG. 7 is a simplified block diagram showing, in greater detail, the execution of the assembler to COBOL migration tool 32, designated broadly as source code processing 130. Source code processing 130 includes defining target source code 132. Unlike COBOL, a typical assembler program does not explicitly work based on variables. For faster execution, and to control memory usage, operating system registers, offset memory addresses, and reference modification techniques are used. Each assembler program can use 16 registers provided by the z/OS (IBM 64-bit operating system). COBOL does not have the facility to use registers and is completely dependent upon variables for data manipulation. As described above in connection with FIG. 5, a user can first select an application (e.g., see step 48 in FIG. 5). By virtue of this selection, a target source code is defined, represented as block 134. It should be understood that this may be performed by identifying the source code file(s) in inventory as a result of the user selection of the application. Additionally, assembler to COBOL migration tool 32 also includes a dynamic code simulation module 136, stored in memory 504, and configured to be executed by one or more processor(s) 502. While the parser module 100 is configured to parse the target source code in a conventional sense of the term parsing, the dynamic code simulation module 136 is configured to dynamically simulate execution of the code for purposes to be described below. Thus, as shown in FIG. 7, once the target source code 134 has been selected/identified, it is acted upon by parser module 100 suited to the specific programming language (e.g., COBOL, etc.), whose parser outputs are designated by block 138, as well as being acted upon by the dynamic simulation module 136.

In embodiments, parser module 100 determines the register names used for operation but is not able to determine what the registers represent. For migration into COBOL, dynamic code analysis (e.g., simulation) provides the exact value present in the registers and the base register associated with the variables. This is accomplished by the dynamic simulation of the operations done on the registers in each line of source code and maintains the output in several dynamic memory arrays from the start of the source code up to the line of source code being converted (e.g., migrated). Execution (e.g., simulation) of code will need to run the compiled code on a z/OS platform (e.g., COBOL) using input data provided by the user. During simulation, an intelligent code interpreter determines the best possible outcomes of the operation and stores the outcomes (e.g., outputs) into the dynamic memory array 144. This is represented by the parallel paths shown in FIG. 7.

Dynamic code analysis is a point of novelty with respect to migration from assembler to COBOL. Unlike COBOL, a typical assembler program does not explicitly work based on variables. To execute faster and control memory usage, Operating Systems' registers, offset memory addresses and reference modification techniques are used. Each assembler program can use 16 registers provided by z/OS. COBOL does not have facility to use registers and is completely dependent on variables for data manipulation.

A static line by line parser will only determine the register names being used for operation but cannot determine what these registers represent. For migration into a COBOL code Dynamic code analysis technique provides the exact value present in registers and the base register associated with variables. This is done by simulating the operations done on registers in each line of code and maintain the outcome in several dynamic memory arrays from the start of program up to the line of code being converted.

With continuing reference to FIG. 7, the parser outputs are acted upon by the dynamic simulation module 142. In dynamic simulation module 142, assembler to COBOL migration tool 32 simulates the memory of each application component without actually running the component on a given platform (e.g., COBOL). Assembler to COBOL migration tool 32 creates (e.g., simulates), multiple memory arrays (e.g., dynamic memory array 144), shown in detail in FIG. 7), that are dynamic and may hold different types of data (e.g., constants, numeric, alphanumeric, and/or addresses). Dynamic simulation module 142 resolves and detects runtime parameters of the source code by monitoring the progress of the simulation. Dynamic simulation module 142 captures resolved and detected parameters which are stored in metadata register 144. Parsing output 138 and metadata register 144 are used by assembler to COBOL migration tool 32 for analysis and generation of reports as well as conversion to a different language and/or database.

Dynamic code analysis was developed specifically for IAT, dynamic BRE, multi program flow chart generation and Language migration. In IAT, the dynamic code analysis is used to understand the Static and dynamic program calls to gather the application program flow and generate Call Tree Report. The Call Tree report gives detail information about all the calling and called program along with screens, DB and files used. In BRE dynamic code analysis extracts all the branch path of the programs based on the test data provided to the simulated program execution. The objective is to make sure all the rules are extracted and 100% code coverage is achieved. This is an iterative process, when gaps are identified new test cases will be created for the identified gap and re-executed to confirm all the gaps are covered.

Execution of code will need to actually run the compiled code on z/OS platform using input data. During simulation an intelligent code interpreter determines best possible outcome of the operation and stores it into a dynamic memory.

An example of migration from assembler to COBOL as processed by the Assembler to COBOL migration tool 32 is detailed as follows. For assembler code given by "L R10, VAR001" is equivalent to populating Register 10 with VAR001 (a variable) and "ST R10, VAR002" is equivalent to populating VAR002 (another variable) with the value present in Register 10. As Register 10 has been populated with VAR001 earlier, effectively VAR002 is receiving the value of VAR001. Static parsing is not able to determine the effective statement and can only interpret that the value of Register 10 is being moved to VAR002. Dynamic code analysis (e.g., simulation), can determine that the effective value of VAR001 is moved into VAR002.

The BRE tool will look for the Assembler statements, register related information and copy books for variable declarations and simulate the program execution. Using dynamic code analysis technique, which helps to retrieve the exact value present in registers and the base register associated with variables. The BRE tool also gathers all the logical branch path logic of the assembler program. This is done by simulating the operations done on registers in each line of code and maintain the outcome in several dynamic memory arrays from the start of program up to the line of code being converted.

The assembler to COBOL migration tool 32 converts assembler macros and copybooks into COBOL programs. The assembler to COBOL migration tool 32 covers application code automated migration from second generation assembler language to third generation COBOL language, converts assembler copybooks to COBOL copybooks and converts conditional assembly instructions to COBOL statements. The assembler to COBOL migration tool 32 is not limited to static code analysis. The assembler to COBOL migration tool 32 simulates the assembler execution to resolve the registers and operands as necessary. The assembler to COBOL migration tool 32 looks for assembler statements, register related information and/or copybooks for variable declarations and then simulates the program execution. The assembler to COBOL migration tool 32 uses dynamic code analysis to retrieve the exact value present in registers and/or the base register associated with the variables. The assembler to COBOL migration tool 32 also gathers (e.g., collects) all the logical branch path logic of the assembler program by simulating the operations done on the registers in each line of the source code and maintaining the outcome (e.g., output) in dynamic memory array 144 from the start of the program up to the line of source code being converted.

Figure 8:
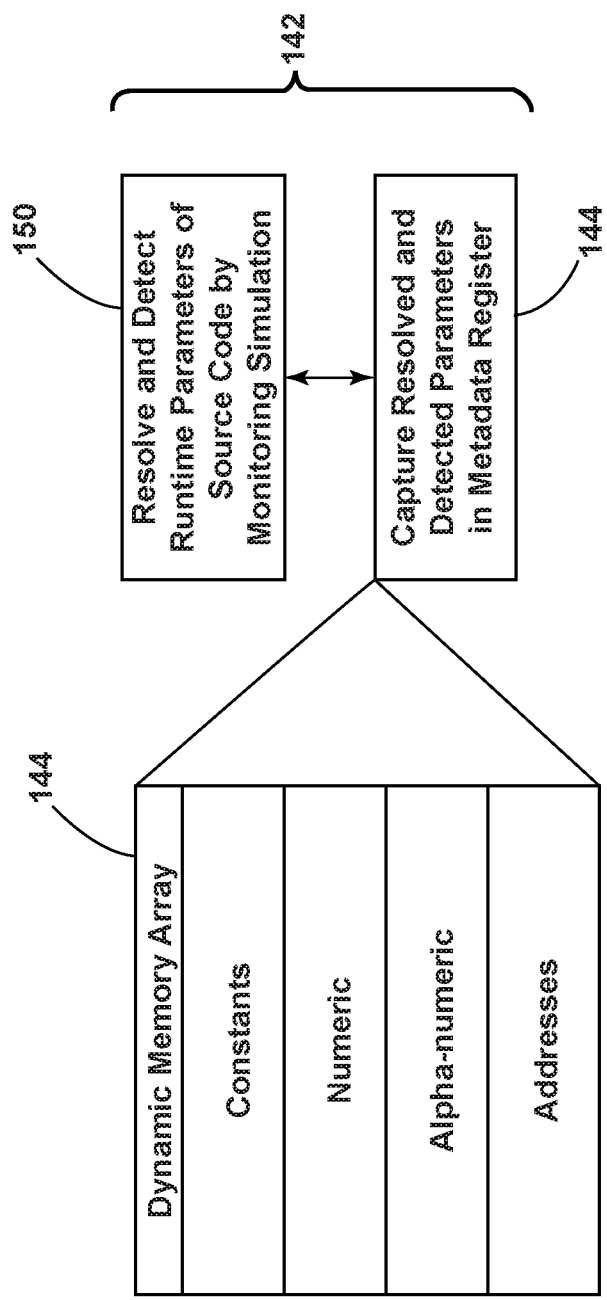
FIG. 8 is a block diagram generally illustrating a dynamic code simulation feature of the method and apparatus for language migration of FIG. 5.

FIG. 8 is a simplified block diagram showing, in greater detail, the execution of assembler to COBOL migration tool 32, designated broadly as dynamic memory array 144 and dynamic simulation of source code module 142, including resolve and detect runtime parameters of source code by simulation module 150 and capture resolved and detected parameters in metadata register 144. The simulation (e.g., execution) of the source code generates dynamic data, stored in dynamic memory array 144. Assembler to COBOL migration tool 32 is configured to analyze the inventory of the program in a statically via parsing of the source code and dynamically via simulating the source code. The parsing output 138 and the metadata register 144 are used by assembler to COBOL migration tool 32 to generate reports pertaining to the source code that include all components of the source code are inventoried and classified by assembler to COBOL migration tool 32.

In embodiments, dynamic simulation of the source code (i.e., dynamic code analysis), is used by assembler to COBOL migration tool 32 because static parsing does not reflect the runtime execution of the actual source code. By using dynamic simulation, the actual source code is expanded and/or converted into the form whereby virtual machines of assembler to COBOL migration tool 32 can run (e.g., simulate) the source code. This dynamic simulation (e.g., parsing) is only possible via the simulation of the virtual machines. Assembler to COBOL migration tool 32 generates sample data based on the data types of the source code that is also passed into the simulation and/or virtual machines to identify the different execution branch paths of the source code. Dynamic simulation (e.g., parsing) is an additional layer of analysis (e.g., intelligence) based on traditional, static parsing which determines the best possible outcome (e.g., output) based on available information. Dynamic simulation is also output internally (e.g., metadata) to be used in subsequent operations. Dynamic simulation includes three principles of operation (i) capture; (ii) use; and (iii) modify. On each line of code, dynamic simulation functions are applied at least one of the three principles. For example, if the "use" function is applied, it resolves indirect references which effectively changes the line of code and makes it compatible with COBOL.

The COBOL to JAVA/C# automated re-architecture tool 34 is a wizard based interactive tool, where the base version of the parser converts the COBOL to JAVA by slicing the COBOL program into Multiple Classes. The Interactive UI allows the user to customize the generated COBOL program. While Parsing the Source COBOL code, it identifies all the Duplicate code across the source inventory and create the Meta data. Micro services wizard allows the user to select the code snippet from the meta data created, and move the code snippets either to Utility class or create a new micro services. Also allows the user to create entry in the Micro services DB, if they consume any enterprise services. The objective is to replace the legacy code with the Enterprise services. UI Refactor Wizard allow the user to refactor the tool generated white screen to Rich IA webpage. It allows the user to add new labels, controls and change the exiting Controls. Parallel processing wizard help the user to identify the long running business programs/process. Pull out those process and execute the same in paralleling processing framework to reduce the execution time and to speed up the process.

Exit Legacy language migration toolkit 16 converts COBOL programs into JAVA POJO class. The tool support conversion from CICS COBOL/DB2 to JAVA/Oracle; also supports file operations. It ensures that there are no functional gaps due to automated migration process. FIG. 9 is a high-level operational model of COBOL to Java migration module.

Figure 10A:
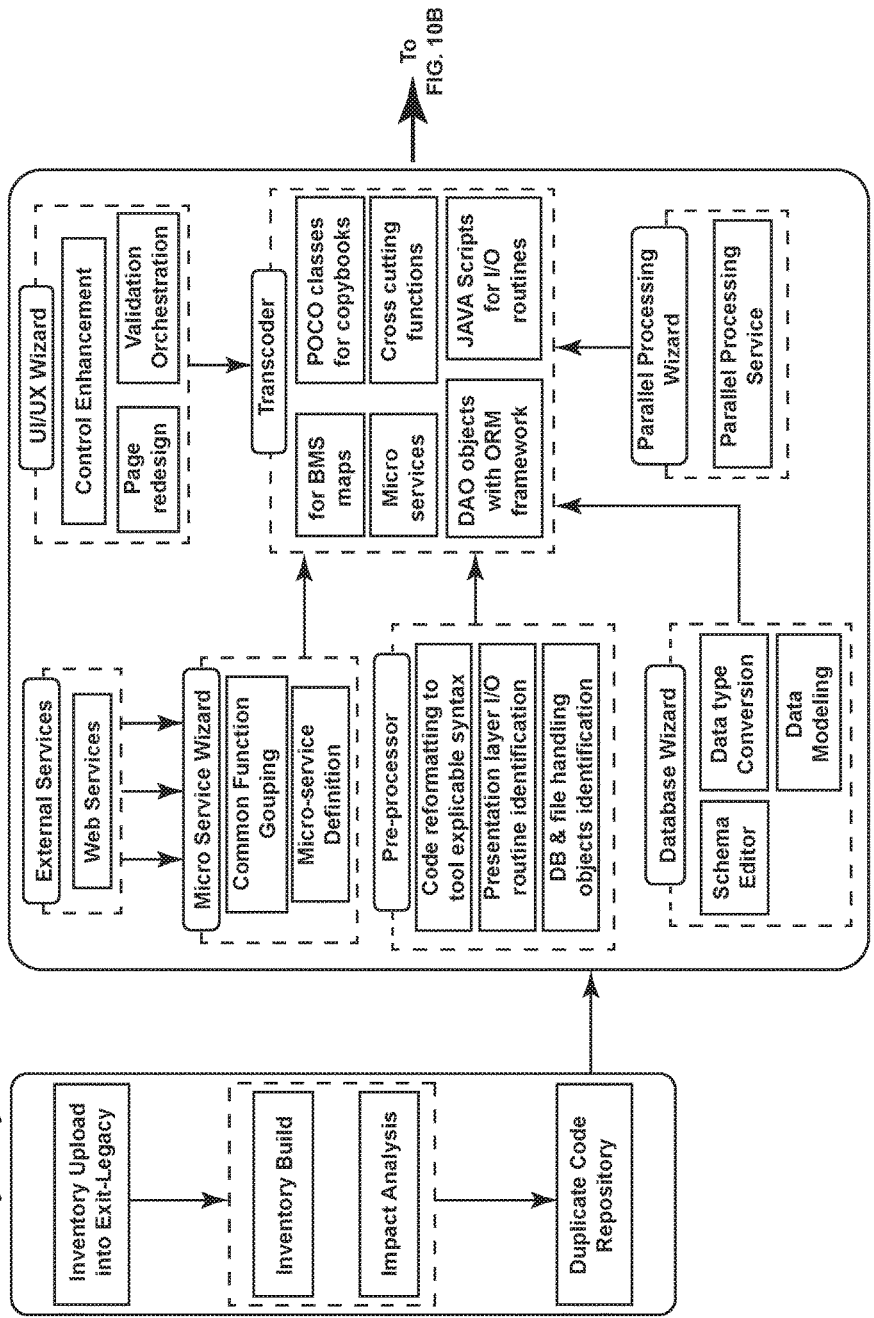
FIGS. 10A-10B are block diagrams generally illustrating a high-level operational model of COBOL to C# migration module.
Figure 10B:
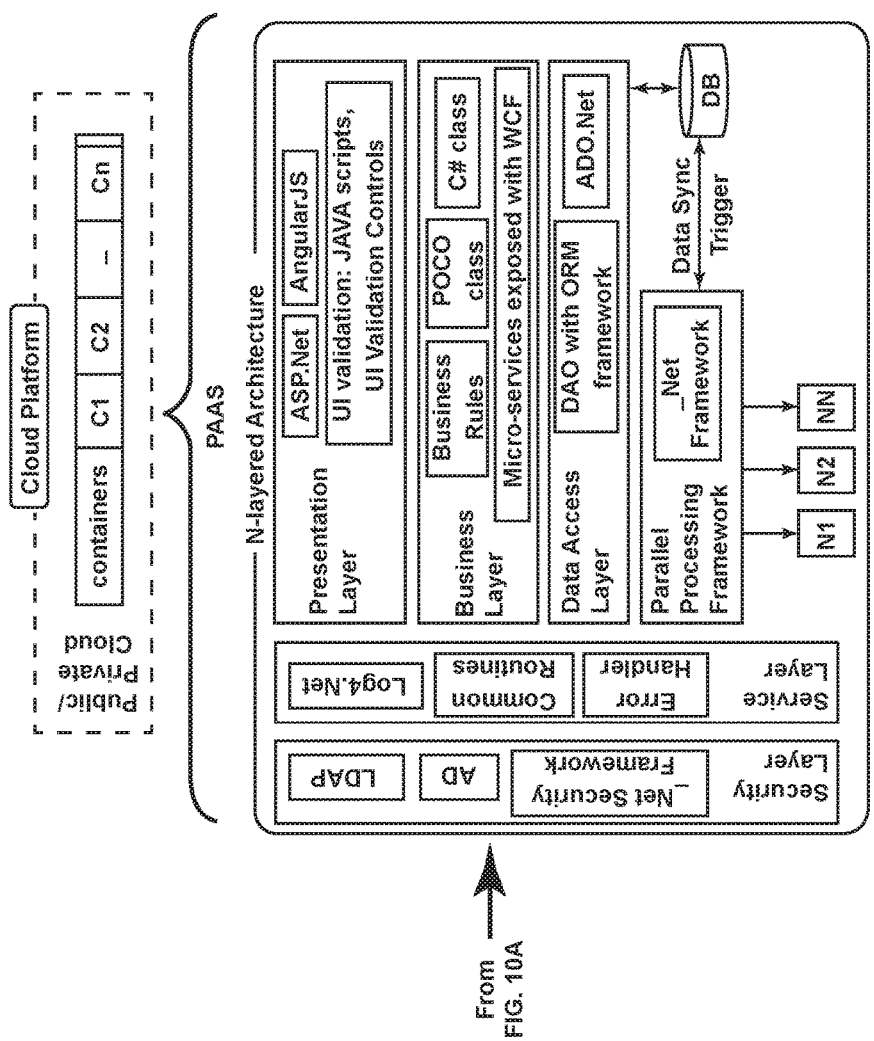

The COBOL to C# automated re-architecture tool 34 is a Wizard based interactive tool, where the base version of the parser converts the COBOL to C# by slicing the COBOL program into Multiple Classes. The Interactive UI allows the user to customize the generated COBOL program. While Parsing the Source COBOL code, it identifies all the Duplicate code across the source inventory and create the Meta data. Micro services wizard allows the user to select the code snippet from the meta data created, and move the code snippets either to Utility class or create a new micro services. Also allows the user to create entry in the Micro services DB, if they consume any enterprise services. The objective is to replace the legacy code with the Enterprise services. UI Refactor Wizard allow the user to refactor the tool generated white screen to Rich IA webpage. It allows the user to add new labels, controls and change the exiting Controls. Parallel processing wizard help the user to identify the long running business programs/process. Pull out those process and execute the same in paralleling processing framework to reduce the execution time and to speed up the process. FIGS. 10A-10B are a high-level operational model of COBOL to Java migration module.

In Exit Legacy, duplicate paragraphs are identified during the initial inventory analysis by IAT 20 and stored in a database. During automated code conversion, Exit Legacy prompts the user to identify which part of the duplicate code (if any) is to be converted as micro services. A GUI editor is provided to modify the generated JAVA/HTML/ANGULAR JS page. Using the GUI editor, the user can refactor the generated JAVA/HTML5/ANGULAR JS page by replacing the controls and/or adding new labels and/or controls to the page and generate a new Rich Internet Application (RIA) web page. A parallel processing wizard helps the user to identify the time consuming business functionality program(s) which can be executed in the parallel processing framework, which helps to reduce the execution time.

The language migration tool 16 ("Exit Legacy"), includes features that converts PL/1 with DB2, VSAM, and Sequential File handling programs and copybooks into JAVA programs and classes, and RDBMS as a database store. The language migration toolkit 16 supports converting PL/1 online screens Basic Mapping Support (BMS) to HTML/Angular JS. The tool generates technically object oriented JAVA classes where the PL/1 codes are sliced at a micro level and de-duplicates the rules and re-orchestrates the program flow. The language migration tool 16 parses the PL/1 code and creates mapping of the PL/1 keywords with equivalent JAVA keywords. The language migration tool 16 then reads the PL/1 code and transcodes to JAVA code using PL/1 keywords with equivalent JAVA keyword mapping. The JAVA code is written to a text file that can be viewed by the user and/or downloaded to a user computer.

The language migration tool 16 includes an intelligent built in parser that, while scanning the source code, automatically categorizes GUI, business and data access logic from the source program and generates multilayered application code. While converting the database calls, the language migration tool 16 always refers to the target database schema and appropriate changes are made in the tool generated code to handle the parent/child relationship in the application. The language migration tool 16 includes a feature that changes made to the database are reflected in the tool generated application source.

The language migration tool 16 converts Natural/ADABAS and Sequential File handling programs into COBOL DB2 programs. The language migration tool 16 also converts Natural online Maps to CICS BMS. The language migration tool 16 automatically converts the ADABAS calls to equivalent DB2 calls in the COBOL program and handles all the database related errors. The MU (multiple occurring field) and PE (periodic group) fields are converted as child tables and the equivalent DB2 cursors are created in the COBOL programs. The control variables and attribute definitions are also handed by the language migration tool 16. The language migration tool 16 parses the Natural ADABAS code and creates mapping of Natural keywords with equivalent COBOL keywords. The language migration tool 16 then reads the Natural code and transcodes to COBOL code using the COBOL with equivalent keywords mapping. The COBOL code is written to a text file that can be viewed and downloaded by the user.

The language migration tool 16 converts Natural ADABAS and Sequential File handling programs into JAVA classes and RDBMS as database store. The language migration tool 16 also supports converts Natural online screens to HTML/Angular JS. The language migration tool 16 generates technically object oriented JAVA classes where the Natural codes are sliced at a micro level and de-duplicate the rules and automatically re-orchestrate the program flow. The language migration tool 16 parses the Natural ADABAS code and creates mapping of Natural keywords with equivalent JAVA keywords. The language migration tool 16 then reads the Natural code and transcodes to JAVA code using the natural keywords with equivalent JAVA keyword mapping. The JAVA code is written to a text file that can be viewed and downloaded by the user. The language migration tool 16 includes an intelligent built in parser that, while scanning the source code, automatically categorizes GUI, business and data access logic from the source program and generates multilayered application code. While converting the database calls, the language migration tool 16 always refers to the target database schema and appropriate changes are made in the tool generated code to handle the parent/child relationship in the application. The language migration tool 16 includes a feature that changes made to the database are reflected in the tool generated application source.

The JCL to Spring Batch tool 36 converts JCL, COBOL, Files to equivalent Eclipse Project containing Spring Batch, tasklets, and JAVA POJO objects. It provides pre-built cloud enabled JAVA utilities that are equivalents of JCL utilities including SORT and database manipulations. Spring Batch is used for JAVA migration and Summer Batch is used for .Net migration.

The JCL to Summer Batch tool 36 converts JCL, COBOL, and Sequential Files to equivalent .Net Projects containing Summer batch, tasklets, and C# POCO Class. The JCL to Summer Batch tool 36 provides pre-built Cloud enabled C# utilities that are equivalents to JCL utilities including SORT and database manipulations.

The language migration tool 16 includes a code refactoring solution to identify the duplicate code from the migrated source code and eliminate the duplicate code. This helps to remove the duplicate code from the entire inventory and replaces it with the utility/common class functions. The duplication identification can be performed at various levels, such as (i) entire code support; (ii) at line level; (iii) at class level; (iv) at method level; (v) at different order of lines; and (vi) between lines.

The language migration tool 16 includes a dead code analyzer to identify the variables, paragraph, methods and functions that are not being used in the application and will comment out the unused code. The ready to use modified source code can be downloaded in a text format.

The language migration tool 16 includes a code restructurer to identify the expensive statements of COBOL language (e.g., GOTO, STRING, handling functions), and replace them with non-expensive statements/functions. This helps to improve the performance of the application and make the application code in a more structured, readable, and understandable form.

The language migration tool 16 includes a containerization solution to deploy the converted application into dockers and containers. The language migration tool 16 creates the container and installs all the required software for the application to run and deploys the migrated application code. Once the container is created, a report generated to display the container identification, Internet protocol (IP) address of the container and the current status of the container. The language migration tool 16 monitors the status of the container, whether the container is running, the need to start/stop the container, or delete the existing container.

It should be understood that a processor (e.g., processor 502), as described herein may include a conventional processing apparatus known in the art, capable of executing preprogrammed instructions stored in an associated memory, all performing in accordance with the functionality described herein. To the extent that the methods described herein are embodied in application source code, the resulting application source code can be stored in an associated memory, such as memory 504, and can also constitute the means for performing such methods. Such a system or processor may further be of the type having both ROM, RAM, a combination of non-volatile and volatile (modifiable), memory so that any application source code may be stored and yet allow storage and processing of dynamically produced data and/or signals.

In embodiments, a memory (e.g., memory 504), may be configured for storage of data, instructions, and/or code (e.g., dynamic simulation logic 136), and is coupled to at least a corresponding processor. Memory may include various forms of non-volatile (e.g., non-transitory), memory including flash memory, read only memory (ROM), including various forms of programmable read only memory (e.g., PROM, EPROM, EEPROM), and/or volatile memory such as random access memory (RAM), including static random access memory (SRAM), dynamic random access memory (DRAM), and/or synchronous dynamic random access memory (SDRAM). Although memories and processors may be illustrated as separate components, it should be understood that, in embodiments, a memory may be internal to a processor.

Display devices may be configured to display aspects of GUIs, which may be generated by the operation of logic (e.g., dynamic simulation logic 136). Display devices may be, for example only, a liquid crystal display or light emitting diode display or other technologies known in the art. Display devices may function as only an output device with input received through other I/O devices (e.g., I/O devices), such as a keyboard or mouse (not shown). Alternatively, display devices may also function as an input device and may include a touch screen display including, for example, capacitive and/or resistive touch screen displays, and/or other technologies known in the art.

It should be further understood that an article of manufacture in accordance with this disclosure includes a non-transitory computer-readable storage medium (e.g., memory 504), having a computer program encoded thereon for implementing logic and other functionality described herein. The computer program may include code to perform one or more of the methods disclosed herein. Such embodiments may be configured to execute on one or more processors, multiple processors that are integrated into a single system or are distributed over and connected together through a communications network, and/or where the network may be wired or wireless. Code for implementing logic may, when executed by a processor, cause a plurality of transistors to change from a first state to a second state. A specific pattern of change (e.g., which transistors change state and which transistors do not), may be dictated, at least partially, by the logic and/or code. For example, and without limitation, in embodiments, processor of system may include a plurality of transistors that change state according to logic and/or code that implements logic.

In embodiments, the term "module" includes an identifiable portion of computer code, computational instructions, executable instructions, data, and/or a computational object to achieve a particular function, operation, processing, and/or procedure. A module may be implemented via software, hardware/circuitry, or a combination of software and hardware. A module, for example, may comprise one or more physical or logical blocks of computer instructions that may, for instance, be organized as an object, procedure, or function. In embodiments, executables of a module may not be physically located together and/or may include disparate instructions stored in different locations which, when joined logically together, may comprise the module and/or achieve the stated purpose for the module. In embodiments, a module may include a single instruction, many instructions, and/or may be distributed over several different code segments, among different programs, and/or across several memory devices. In embodiments, modules may represent data and may be embodied in any suitable form and/or may be organized within any suitable type of data structure. The represented data may be collected as a single data set and/or may be distributed over different locations, such as different storage/memory devices.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "embodiments," "one embodiment," or "an embodiment," or the like, means that a particular feature, structure, or characteristic described in connection with the embodiment is included in at least one embodiment. Thus, appearances of the phrases "in various embodiments," "in embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like), are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure as defined in the appended claims.

Any element in a claim that does not explicitly state "means for" performing a specified function, or "step for" performing a specific function, is not to be interpreted as a "means" or "step" clause as specified in 35 U.S.C. § 112, paragraph 6 (pre-AIA), or 35 U.S.C. § 112(f) (AIA). In particular, the use of "step of" in the claims is not intended to invoke the provisions of 35 U.S.C. § 112, paragraph 6 (pre-AIA) or 35 U.S.C. § 112(f) (AIA).

What is claimed is:

1. A computerized method comprising the steps of:
   selecting at least one application having a source code in an original language;
   parsing the source code in the original language and generating a first output;
   dynamically analyzing the source code in the original language by simulating the memory of the at least one application having the source code and simulating execution of the source code within the simulated memory to produce a second output wherein the second output comprises runtime metadata associated with the selected at least one application, wherein the dynamically analyzing the source code further comprises:
   simulating memory to simulate execution of the source code by creating at least one dynamic memory array;
   simulating the execution of the source code within the dynamic memory array;
   detecting and resolving parameters of the source code by monitoring the simulated execution of the source code;
   storing the detected and resolved parameters of the source code in a metadata register; and
   generating at least one report of the source code based upon the detected and resolved parameters stored in the metadata register; and
   converting, using said first output and said second output comprising runtime metadata, at least one of:
   (i) the source code of the selected application in the original language to a destination language; and
   (ii) a data source associated with the selected application in an assigned format to a destination format.

2. The method of claim 1, further comprising classifying the source code according to functionality and updating an inventory classification table and summarizing an inventory of the source code.

3. The method of claim 1, further comprising parsing the source code to determine non-functional and duplicate source code, generating a natural language based query for searching the source code, and classifying business rules of the source code and identifying logical conditions of the business rules.

4. The method of claim 3, wherein identifying logical conditions of the business rules further comprises identifying child statements of the business rules and generating a report of the business rules and child statements of the business rules.

5. The method of claim 1, further comprising extracting and parsing business rules, comparing the business rules for similarity and duplication, and generating a flowchart of the business rules.

6. The method of claim 1, wherein detecting and resolving parameters of the source code by monitoring the simulated execution of the source code includes detecting and resolving registers and operands of the source code.

7. An article of manufacture, comprising:
   a non-transitory computer storage medium having a computer program encoded thereon for business rule extraction, said computer program including code for:
   selecting at least one application having a source code in an original language;
   parsing the source code in the original language and generating a first output;
   dynamically analyzing the source code in the original language by simulating the memory of the at least one application having the source code and simulating execution of the source code within the simulated memory to produce a second output wherein the second output comprises runtime metadata associated with the selected at least one application, wherein the dynamically analyzing the source code further comprises:
   simulating memory to simulate execution of the source code by creating at least one dynamic memory array;
   simulating the execution of the source code within the dynamic memory array;
   detecting and resolving parameters of the source code by monitoring the simulated execution of the source code;
   storing the detected and resolved parameters of the source code in the metadata register; and
   generating at least one report of the source code based upon the detected and resolved parameters stored in the metadata register; and converting, using said first output and said second output comprising runtime metadata, at least one of:
(i) the source code of the selected application in the original language to a destination language; and
(ii) a data source associated with the selected application in an assigned format to a destination format.

8. The article of manufacture of claim 7 wherein said computer program includes code for:
(i) analyzing the source code for obsolete and unwanted components;
(ii) deleting obsolete source code; and
(iii) verifying, extracting, and identifying the source code prior to simulated execution.

9. The article of manufacture of claim 7 wherein said computer program includes code for:
(i) classifying the source code according to functionality;
(ii) updating an inventory classification table; and
(iii) summarizing an inventory of the source code.

10. The article of manufacture of claim 7 wherein said computer program includes code for:
(i) parsing the source code to determine non-functional and duplicate source code;
(ii) generating a natural language based query for searching the source code; and
(iii) classifying business rules of the source code and identifying logical conditions of the business rules.

11. The article of manufacture of claim 7 wherein said computer program includes code for:
(i) identifying child statements of business rules; and
(ii) generating a report of the business rules and child statements of the business rules.

12. The article of manufacture of claim 7 wherein said computer program includes code for:
(i) extracting and parsing business rules;
(ii) comparing the business rules for similarity and duplication; and
(iii) generating a flowchart of the business rules.

13. The article of manufacture of claim 7 wherein said computer program includes code for detecting and resolving registers and operands of the source code.

14. A system comprising:
one or more computing devices including a memory having program code stored therein and a processor in communication with the memory for carrying out instructions in accordance with the stored program code, wherein the program code, when executed by the processor, causes the processor to:
select at least one application having a source code in an original language;
parse the source code in the original language and generating a first output;
dynamically analyze the source code in the original language by simulating the memory of the at least one application having the source code and simulating execution of the source code within the simulated memory to produce a second output wherein the second output comprises runtime metadata associated with the selected at least one application, wherein the dynamically analyzing the source code further comprises:
simulating memory to simulate execution of the source code by creating at least one dynamic memory array;
simulating the execution of the source code within the dynamic memory array;
detecting and resolving parameters of the source code by monitoring the simulated execution of the source code;
storing the detected and resolved parameters of the source code in a metadata register; and
generating at least one report of the source code based upon the detected and resolved parameters stored in the metadata register; and
convert, using said first output and said second output comprising runtime metadata, at least one of:
(i) the source code of the selected application in the original language to a destination language; and
(ii) a data source associated with the selected application in an assigned format to a destination format.

15. The system of claim 14, wherein classifying the source code according to functionality and updating an inventory classification table and summarizing an inventory of the source code.

16. The system of claim 14, wherein dynamic analyzing the source code further comprises parsing the source code to determine non-functional and duplicate source code, generating a natural language based query for searching the source code, and classifying business rules of the source code and identifying logical conditions of the business rules.

17. The system of claim 14, wherein detecting and resolving parameters of the source code by monitoring the simulated execution of the source code includes detecting and resolving registers and operands of the source code.

* * * * *